(12) United States Patent
Kahn et al.

(10) Patent No.: US 7,693,717 B2
(45) Date of Patent: Apr. 6, 2010

(54) SESSION FILE MODIFICATION WITH ANNOTATION USING SPEECH RECOGNITION OR TEXT TO SPEECH

(75) Inventors: Jonathan Kahn, Crown Point, IN (US); Michael C. Huttinger, Valparaiso, IN (US)

(73) Assignee: Custom Speech USA, Inc., Crown Point, IN (US)

(*) Notice: Subject to any disclaimer, the term of this patent is extended or adjusted under 35 U.S.C. 154(b) by 147 days.

(21) Appl. No.: 11/279,551

(22) Filed: Apr. 12, 2006

(65) Prior Publication Data

US 2007/0244702 A1   Oct. 18, 2007

(51) Int. Cl.
G10L 13/00 (2006.01)
G10L 11/00 (2006.01)

(52) U.S. Cl. .................. 704/260; 704/276; 704/278
(58) Field of Classification Search .......... 704/260, 704/276, 278
See application file for complete search history.

(56) References Cited

U.S. PATENT DOCUMENTS

| | | | | |
|---|---|---|---|---|
| 5,920,836 A * | 7/1999 | Gould et al. | ................. | 704/251 |
| 5,960,394 A * | 9/1999 | Gould et al. | ............. | 704/270.1 |
| 6,073,097 A * | 6/2000 | Gould et al. | ................. | 704/251 |
| 6,101,468 A * | 8/2000 | Gould et al. | ................. | 704/251 |
| 6,438,545 B1 * | 8/2002 | Beauregard et al. | ............. | 707/6 |
| 6,513,003 B1 * | 1/2003 | Angell et al. | ................ | 704/235 |
| 6,606,479 B2 * | 8/2003 | Cook et al. | ................. | 434/350 |
| 6,760,746 B1 * | 7/2004 | Schneider | .................... | 709/203 |
| 6,839,669 B1 * | 1/2005 | Gould et al. | ................. | 704/246 |
| 6,850,252 B1 * | 2/2005 | Hoffberg | ..................... | 715/716 |
| 6,993,120 B2 * | 1/2006 | Brown et al. | ............. | 379/88.13 |
| 7,315,818 B2 * | 1/2008 | Stevens et al. | .............. | 704/235 |
| 7,337,116 B2 * | 2/2008 | Charlesworth et al. | ...... | 704/254 |
| 7,346,506 B2 * | 3/2008 | Lueck et al. | ................. | 704/235 |
| 7,376,560 B2 * | 5/2008 | Bartosik et al. | ............. | 704/235 |
| 7,398,210 B2 * | 7/2008 | Valdes et al. | ................ | 704/257 |

\* cited by examiner

*Primary Examiner*—Michael N Opsasnick
(74) *Attorney, Agent, or Firm*—Loeb & Loeb LLP

(57) ABSTRACT

An apparatus comprising a session file, session file editor, annotation window, concatenation software and training software. The session file includes one or more audio files and text associated with each audio file segment. The session file editor displays text and provides text selection capability and plays back audio. The annotation window operably associated with the session file editor supports user modification of the selected text, the annotation window saves modified text corresponding to the selected text from the session file editor and audio associated with the modified text. The concatenation software concatenates modified text and audio associated therewith for two or more instances of the selected text. The training software trains a speech user profile using a concatenated file formed by the concatenating software. The session file may have original audio associated with the selected text, wherein the apparatus further comprises software for substituting the modified text for the selected text. In some embodiments, the concatenation software concatenates modified text and audio associated therewith for two or more instances of the selected text. In some embodiments, the training software trains a speech user profile using a concatenated file formed by the concatenating software.

7 Claims, 17 Drawing Sheets

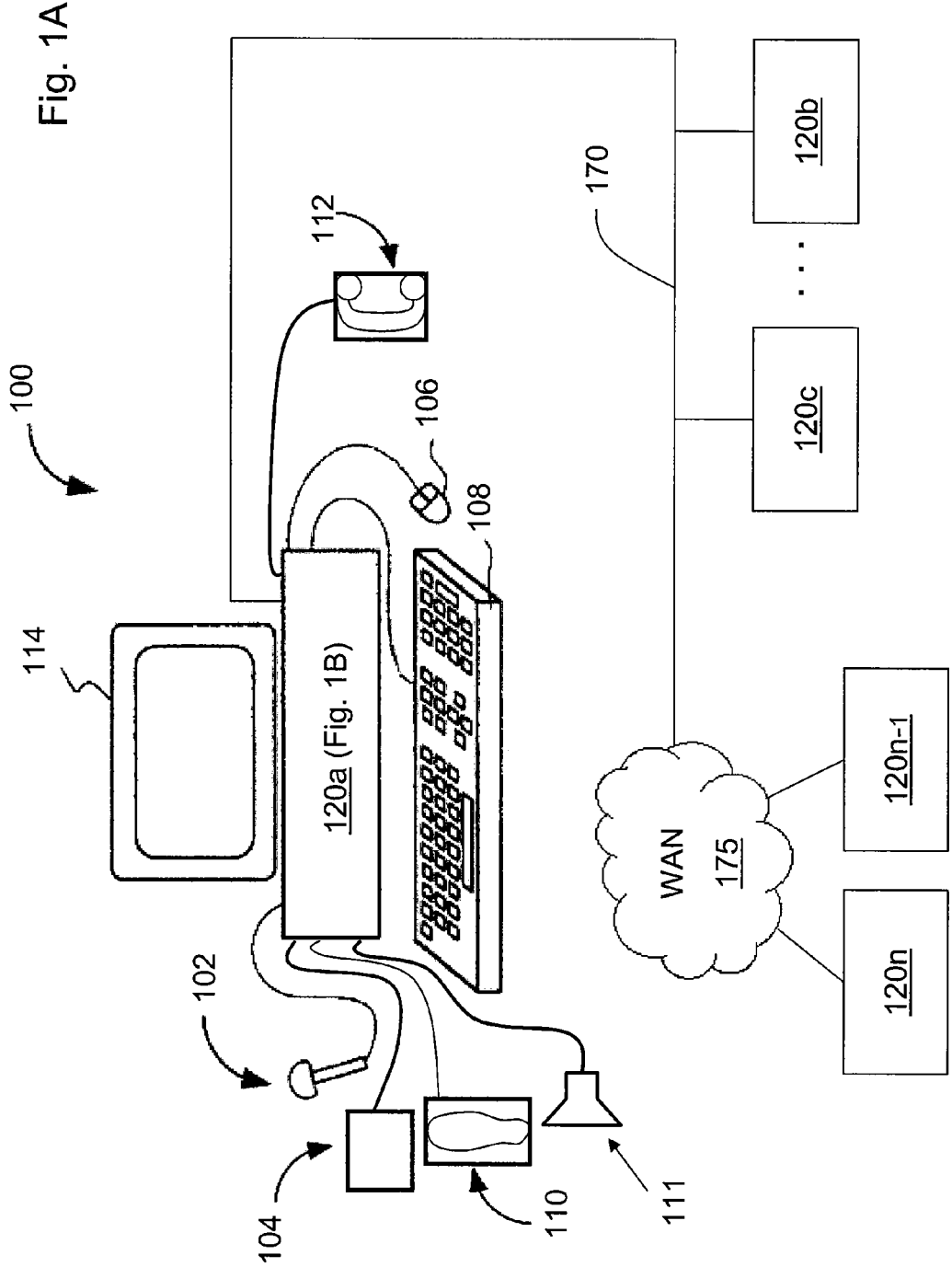

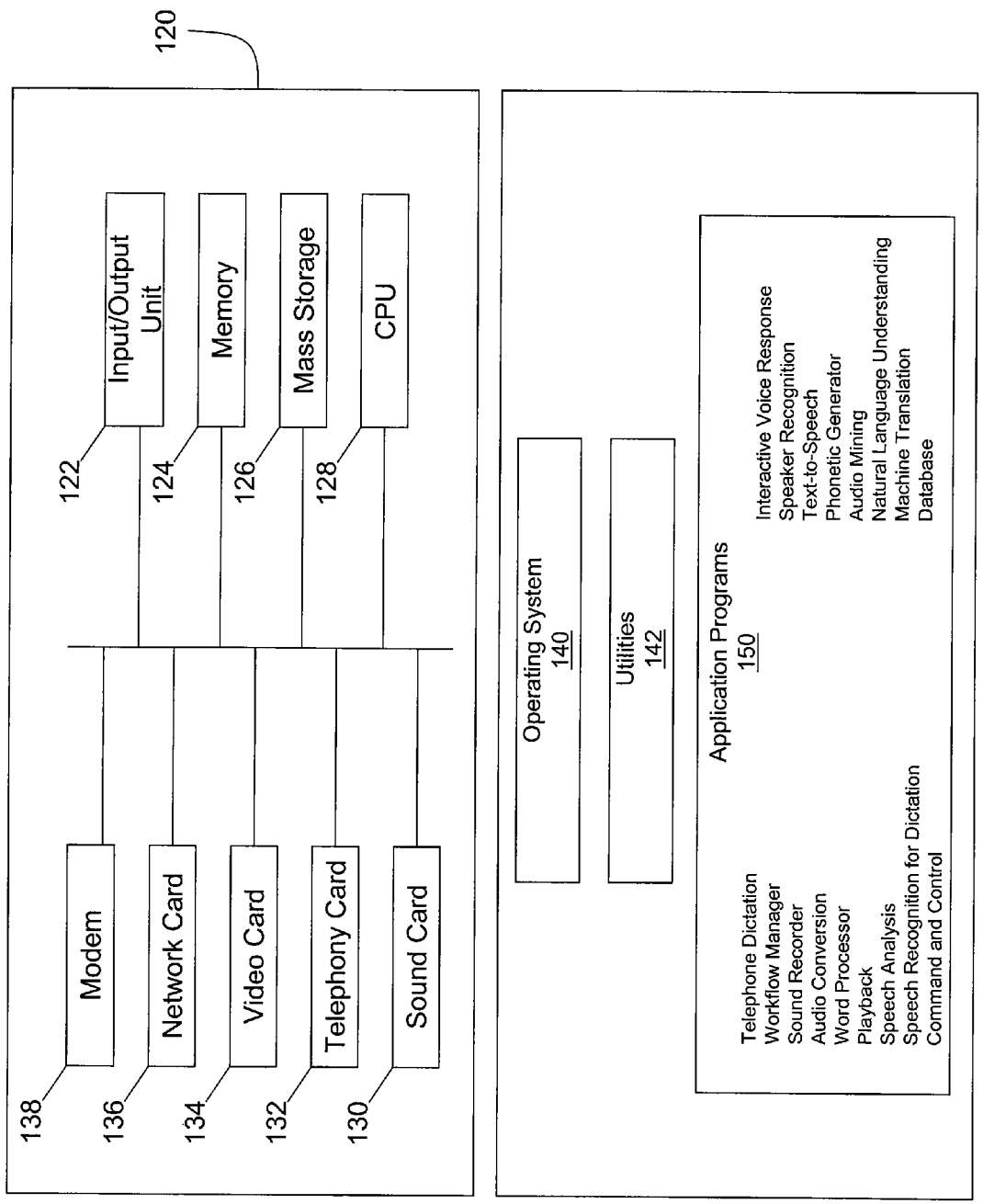

SESSION FILE MODIFICATION WITH ANNOTATION USING SPEECH RECOGNITION OR TEXT TO SPEECH

CROSS-REFERENCE TO RELATED APPLICATION

This application claims the benefit of U.S. Non-Provisional application Ser. No. 11/203,671, entitled "Synchronized Pattern Recognition Source Data Processed by Manual or Automatic Means for Creation of Shared Speaker-Dependent Speech User Profile," filed Aug. 12, 2005, which is still pending (hereinafter referred to as the '671 application). The '671 application is incorporated herein by reference to the extent permitted by law.

BACKGROUND OF THE INVENTION

1. Field of the Invention

The present invention relates to speech and language processing.

2. Background Information

Speech recognition programs include Dragon NaturallySpeaking® (ScanSoft, Inc., Peabody, Mass., now Nuance Communications, Inc.), IBM ViaVoice® (IBM, Armonk, N.Y.), and SpeechMagic® (Philips Speech Processing, Vienna, Austria). Microsoft® Speech Software Development Kit (Microsoft Corporation, Redmond, Wash.) includes Microsoft® Speech Application Programming Interface (SAPI) v.5.x (Microsoft Corporation, Redmond, Wash.) and a speech recognition and text-to-speech engines. NaturalVoices® (AT&T® New York, N.Y.) is another SAPI-compliant text-to-speech engine. Language Weaver (Marina del Rey, Calif.) is an example of machine translation using statistical, probabilistic models.

The speech recognition representational model may be termed a speech user profile and may consist of an acoustic model, language model, lexicon, and other speaker-related data. Other speech and language applications may share some or all of these components.

Most commonly, speech recognition is used for large vocabulary, free-form, continuous dictation for letters, reports, or other documents. Some court reporters and other transcriptionists redictate speech input using real-time speech recognition. Compared to the primary speaker's speech input, redictation with the transcriber's voice may be more accurate and reduce keystrokes and risk of carpal tunnel syndrome. With structured dictation using data categories or fill-in-the-blank forms, a speaker may also use speech recognition to enter text into fields or blanks in a form.

Speech recognition may also be used for synchronizing audio and text data, e.g., in the form of electronic files, representing audio and text expressions of the same or information. See Heckerman et al., "Methods and Apparatus for Automatically Synchronizing Electronic Audio Files with Electronic Text Files," U.S. Pat. No. 6,260,011 B1, issued Jul. 10, 2001.

While speech and language pattern recognition technologies are common, manual techniques still are widely used. Examples include manual transcription with a word processor of dictation or handwritten notes, court reporting or realtime television captioning with a steno machine designed for rapid transcription, or manual translation by a trained professional. Steno machines are available from a variety of manufacturers, including Stenograph, L.L.C. (Mount Prospect, Ill.).

One problem with prior speech recognition options is that they do not provide effective methods for correcting pattern recognition results, e.g., speech recognition text, by another operator, e.g., a second speaker, using the same or different pattern recognition program and saving training data for the respective speech user profiles for the first and second speakers. For instance, currently, when a second, redictating speaker corrects, modifies, or appends to text using speech recognition in a session file created by another user, the second speaker may open the original session file in the speech recognition application, select his or her (the second user's) speech user profile, dictate the correction, and save the text changes. The corrected session file has first speaker's speech input aligned to the corrected text and cannot use this audio-aligned text to train the second speaker's speech user profile. If the second speaker opens the primary speaker's speech user profile to dictate corrections, use of newly dictated audio-aligned text as training data would degrade the first user's profile. Consequently, in the prior art, one speech recognition user cannot effectively use speech recognition to correct the speech recognition dictation of another speaker. The operator must follow other strategies, e.g., creating a text file of the recognized text from the first speaker and opening this in the speech recognition user interface.

Accordingly, a technique is needed that supports creation of training data for both users and otherwise supports modification of session file with speech recognition, text to speech, or other pattern recognition program.

Another limitation of the prior art concerns changing or modify nontext components of a session file, for example audio. Using typical speech recognition or text-to-speech application, a user cannot change, modify, or substitute the audio where the original audio is poor quality and the session file is being accessed for its audio and not text content. For example, a blind user may listen to session file audio on a local computer, or a remote user may access a session file by telephone for playback of dictation. In these circumstances, it would be desirable to replace poor quality audio with a recording of a human voice, synthetic speech from text-to-speech application, or audio enhanced with noise reduction or voice enhancement or other similar techniques.

Another problem with prior speech recognition options concerns structured dictation, e.g., where a speaker is directed to dictate "name," "date," or other specified information. With structured entry, the document, the data, or both may be saved. Structured dictation may also be part of a document assembly program that includes dialogs for selection from alternative boilerplate or other text. Different off-the-shelf programs will extract stored data and generate web-accessible and other electronic reports with searchable fields for health care, law, business, insurance, and other activities. See, e.g., Crystal Reports (Business Objects SA, Paris, France).

As with free-form dictation, prior speech recognition programs do not provide the ability to easily gather training data for both a primary and secondary, correcting speaker. Among other potential problems, the graphical user interfaces of off-the-shelf speech recognition programs do not support easy end-user creation of structured dictation forms for completion by data category that would permit the ordinary end user to use the speech recognition or text-to-speech annotation techniques disclosed herein. For example, with Dragon® NaturallySpeaking®, forms creation for speech recognition require extensive knowledge of a speech recognition application and available software development kit.

Moreover, alignment of pre-existing text to audio has been inefficient using speech recognition. Opportunities to potentially synchronize the text of books, lecture notes, speeches, board meeting minutes, courtroom presentations, and other instances to speech input are not properly capitalized upon because of limitations of conventional speech recognition. These include the failure to support second-speaker correction, the failure to save training data for both the primary and secondary correcting speaker, the need for considerable speech recognition training and correction time, and the difficulty of aligning audio and text with complex electronic files that include verbatim and nonverbatim text and other nondictated elements, such as punctuation (periods, commas, colons, and quotation marks), table of contents, bibliographies, index, page numbers, graphics, and images.

SUMMARY OF DISCLOSURE

The present disclosure teaches various inventions that address, in part or in whole, various needs in the art. Those of ordinary skill in the art to which the inventions pertain, having the present disclosure before them will also come to realize that the inventions disclosed herein may address needs not explicitly identified in the present application. Those skilled in the art may also recognize that the principles disclosed may be applied to a wide variety of techniques involving data interpretation, analysis, or conversion by human operators, computerized systems, or both.

The current disclosure teaches use of an exemplary session file editor that supports session file modification with audio and text annotation using speech recognition and text-to-speech. The annotations may be in the form of comments. They may also be entered as corrections or modifications for text or audio in the main read/write window, e.g., correction of a primary speaker's text with text entered by a second speaker. In some cases the annotation may represent what the first speaker said verbatim, or may represent a final, edited, and more polished version of the original speaker's dictation. The annotation text may also represent a hyperlink, file path, or command line that, when executed, performs an operation, e.g., opening a browser to a particular website or processing a file by a particular program. The session file editor may use Hypertext Markup Language (HTML) for display and Extensible Markup Language (XML) for organization and recording of markup. The speech recognition and text-to-speech applications may be plugins that represent separate applications and load with a main session file editor application, such as SpeechMax™ (available from Custom Speech USA, Inc., Crown Point, Ind.). The speech recognition may be real-time or file based. The text-to-speech application may convert selected text or an entire text file.

Annotations to a transcribed or other session file or text file, may be entered while the session file created by another user is loaded in memory and displayed in a buffered read/write window. Speech recognition may be used to create the annotations, which may be used to replace or append text in the main read/write window. Alternatively, the process may create audio and text annotation with speech recognition and replace read/write window text with annotation text. This use of annotations permits the text and audio from the two speakers to be saved independently. By independently saving the text and audio of two or more speakers it may be more efficient to train the respective speech user profiles of each of the speakers.

A text-to-speech plugin may create speaker output by selecting read/write window text. It may convert text in the annotation window to speech, save the text-audio pair as text-aligned audio, or export the audio as a file. The audio may also be used to replace an audio tag of selected read/write window text. Comments may be created by the speech recognition and text-to-speech plugins without modifying the text or audio tags of audio-aligned text of the read/write window.

Thus, the disclosed method and apparatus support correction of original speech recognition text by another speaker while allowing for the efficient accumulation of training data for both users.

The disclosed methods and apparatus provides the means for enabling an office secretary or transcriptionist to create a session file data entry template from a preexisting paper form or text file using the annotation methods disclosed herein. To create the session file data entry template, text in the main read/write window representing a data category may be selected in the read/write window of the session file editor. The specific text may be indicated by a token, e.g., <PATIENT NAME>, <DATE OF BIRTH>, or the specific text could be in another form or represent a "fill-in-the-blank." The user may create a text annotation using this feature in the exemplary session file editor. The selected text may be further annotated with audio and text with speech recognition, manual keyboard entry and recorded human audio, or both. The resulting session file text may be corrected by another speaker using speech recognition, manual techniques, or both. The paired audio-text may be used as training data for the respective speakers.

The disclosed methods and apparatuses may utilize the techniques and apparatus already disclosed in Applicants' prior, co-pending patent application referenced hereinabove. However, other techniques may be used to capitalize upon these further improvements in the art.

These and other objects and advantages of the present disclosure will be apparent to those of ordinary skill in the art having the present drawings, specifications, and claims before them. It is intended that all such additional systems, methods, features, and advantages be included within this description, be within the scope of the disclosure, and be protected by the accompanying claims.

BRIEF DESCRIPTION OF THE DRAWINGS

FIGS. 1A, 1B and 1C together comprise a block diagram of an exemplary embodiment of a computer within a system or a system using one or more computers.

DETAILED DISCLOSURE

Figure 2:
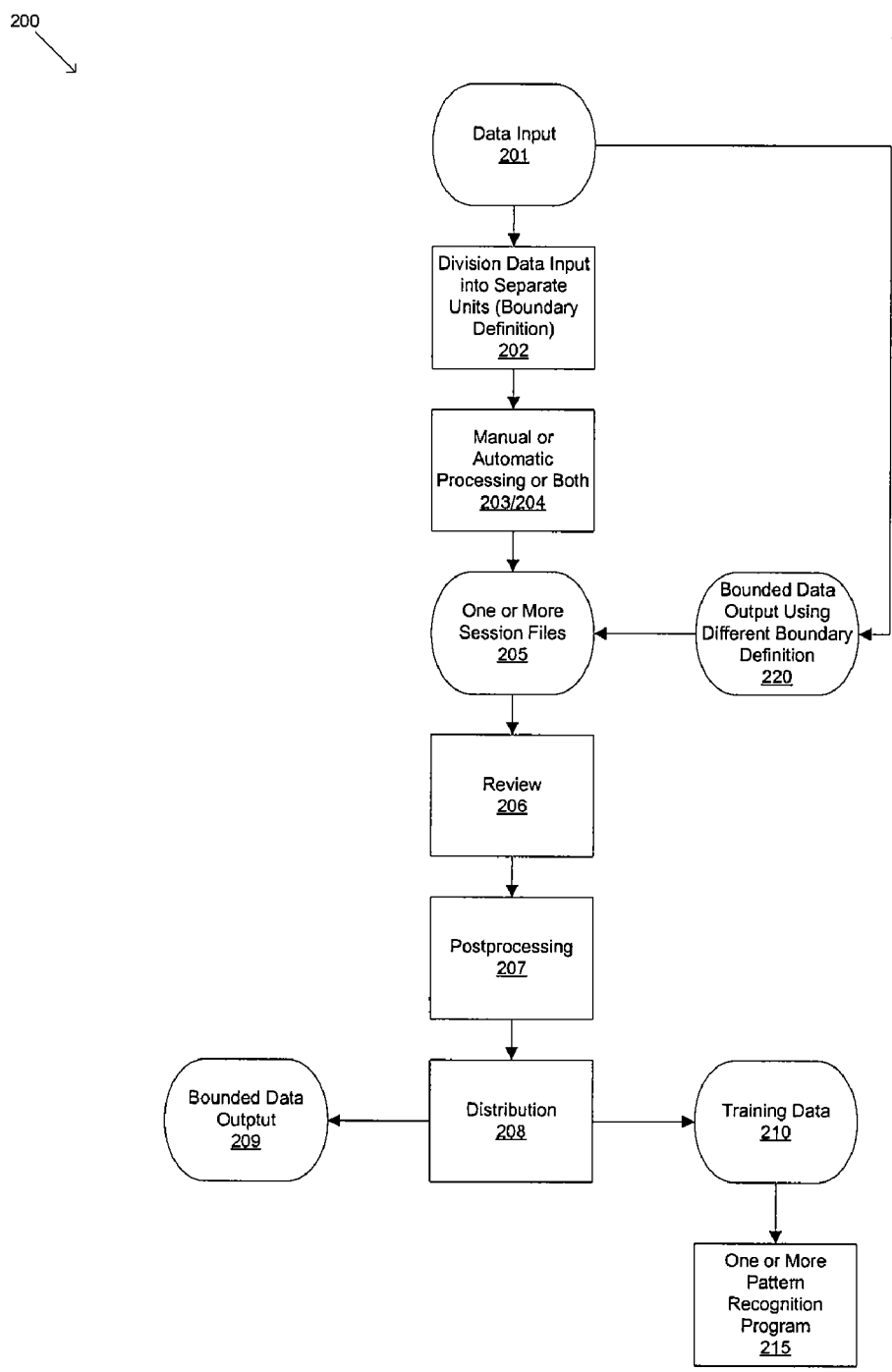
FIG. 2 is a flow diagram illustrating an overview of an exemplary embodiment of the general process of transformation of bounded data into one or more session files.

While the present disclosure may be embodied in many different forms, the drawings and discussion are presented with the understanding that the present disclosure is an exemplification of the principles of one or more inventions and is not intended to limit any one of the inventions to the embodiments illustrated.

I. System 100

FIGS. 1A, 1B, and 1C together comprise a block diagram of one potential embodiment of a system 100. The system 100 may be part of the invention. Alternatively, the invention may be part of the system 100. The system may consist of functions performed in serial or in parallel on the same computer 120*a* or across a local 170 or wide area network 175 distributed on a plurality of computers 120*b*-120*n*.

Each computer 120 includes input and output (I/O) unit 122, memory 124, mass storage 126, and a central processing unit (CPU) 128. Computer 120 may also include various associated input/output devices, such as a microphone 102 (FIG. 1A), digital recorder 104, mouse 106, keyboard 108, transcriptionist's foot pedal 110, audio speaker 111, telephone 112, video monitor 114, sound card 130 (FIG. 1B), telephony card 132, video card 134, network card 136, and modem 138. The keyboard 108 may include a steno machine, as would be used for court reporting or television captioning.

The sound card 130 and telephony card 132 may be single or multichannel. The sound card may be full duplex. Two or more microphones, telephones, or other recording devices may be used for speaker isolation to record speech from two or more speakers. Alternatively, speech input from two or more devices may be recorded as a single file. The telephone system 112 may be analog, digital, or voice over internet protocol (VoIP). In one embodiment shown in FIG. 1C, memory 124 and mass storage 126 jointly and operably hold the operating system 140, utilities 142, and application programs 150.

The computer 120 may be controlled by the Windows® operating system. It is contemplated, however, that the system 100 would work equally well using a Macintosh® operating system or even another operating system such as Linux, Windows CE, Unix, or a Java® based operating system, to name a few. As shown in FIG. 1C, application software 150 may include single or multichannel sound recorder, audio conversion, word processor, transcriptionist audio playback, workflow manager, and speech analysis software modules or programs. Application software 150 may also include speech and language applications, such as speech recognition for dictation, command and control (voice enabling), interactive voice response for telephony, telephone dictation software, speaker recognition, phonetic generator, text-to-speech, text-based or phoneme-based audio mining (word spotting), machine translation, natural language understanding, and database. Application programs may also include pattern recognition programs for image, nonspeech audio, text, and other data input, such as computer-aided medical diagnosis, music analysis, handwriting or optical character recognition, or others. Others software applications could be included, such as database, (audio) noise reduction, voice animation, voice enhancement, document assembly, document processor, reports generation, and media player. Speech recognition may be speaker independent, speaker independent-speaker adaptive, or speaker dependent.

Another of the application programs 150 that is included is a session file editor 160. The session file editor 160 may be the type disclosed in the '671 application. However, it is contemplated that other session file editors may be created to work within the present disclosure. The session file editor 160 may support editing of basic text, including use of structured formatting commands, as illustrated in the toolbars. Most importantly for purposes of the present disclosure, the session file editor supports the operator audio, text and/or verbatim text annotating a selected sentence, phrase, or word within the text file displayed within the interface by clicking-and-dragging the pointer in a Windows® environment and selecting the text to be so annotated. The session file editor 160 also may incorporate segmented audio playback as illustrated in the toolbars. In one approach, the operator may load one or more session files and playback aligned audio. Using the same playback feature, the operator may also playback a word if an individual audio tag exists for the word.

An exemplary graphical user interface showing basic editing of data in for example, .RTF, .TXT, or .HTML format is illustrated throughout this patent application within a Windows® Operating System environment, it being understood that this is solely used to exemplify the teachings of the present invention and not limit the invention to use with the Windows® Operating System. In one approach, the session file editor may only open a session file with a proprietary format (.SES). This proprietary format may use Extensible Markup Language (XML). The session file editor 160 provides various basic options (tools) and language modes. In one approach, style sheets may include color selection based upon annotation markup. In one approach, the type of annotation markup may be indicated by color coding session file editor text. For instance, purple may be used for text annotation only. Blue may indicate annotation including audio, such as recorded audio annotation or combined text and audio annotation, such as with speech recognition or text-to-speech plugin.

Methods or processes in accordance with the various embodiments of the invention may be implemented by computer readable instructions stored in any media that is readable and executable by a computer system. A machine-readable medium having stored thereon instructions, which when executed by a set of processors, may cause the set of processors to perform the methods of the invention. A machine-readable medium may include any mechanism for storing or transmitting information in a form readable by a machine (e.g., a computer). A machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.).

II. Process 200

FIG. 2 provides a general overview of the process 200 of transformation of bounded speech, text, audio, image, or other data input into one or more session files and processing by one or more human operators, computer applications, or both. In a preferred approach, the FIG. 2 process may use the session file editor, a form of HTML text editor, that processes session file markup using Extensible Markup Language (XML). FIG. 2 represents an example of a workflow. The workflow activities may be repeated and order changed in actual practice without departing from the spirit and purpose of the invention.

In step 201, source input may be captured by a sensor (e.g., recorder, scanner, or digital camera). Source input 201 may represent real-time, audio file, or streaming speech input processed by a speech recognition plug-in/program of session file editor Boundary detection and division 202 may be performed by a human operator or automatically as explained in the co-pending patent application and otherwise without departing from the scope of the present invention.

In one approach, using an empty session file, a human operator associates each originally "empty" segment defined by visually-identifiable markers in the session file editor with a particular text, audio, or image tag. In a related approach, dictation or other speech separated into utterances may be associated to text loaded into the session file editor. Split text, text and audio split, text and audio merge, and other features may be used to align each of a plurality of audio segments with the associated text using the session file editor, as disclosed in the '671 application.

In step 203/204, the bounded source data 202, such as speech input segmented into utterances, may be processed manually or automatically by a pattern recognition program, or both, to produce bounded output data. The result may be one or more session files 205 that align bounded data input 202 to bounded results from step 203/204.

The transcribed session file 205 from transcribe mode may represent audio-aligned text, such as with free-form dictation or structured dictation for data entry, using a speech recognition application that integrates boundary definition 202 and automatic processing 203/204. Speech recognition engine may produce real-time output text in the main read/write window that may be saved as a transcribed session file 205.

The audio segments, such as utterances, resulting from boundary definition 202 may be manually aligned to text using various "splitting" techniques for synchronizing transcribed text and audio, as for dictation. Various approaches to these splitting techniques are discussed in the co-pending parent patent application.

Beginning with data input 201 text and boundary definition 202, text-aligned text manual or automatic processing or both 203/204 may be used to create a session file 205 consisting of text-aligned text. Again various approaches may be used to create the session file 205 many being disclosed in the '671 application.

Figure 7:
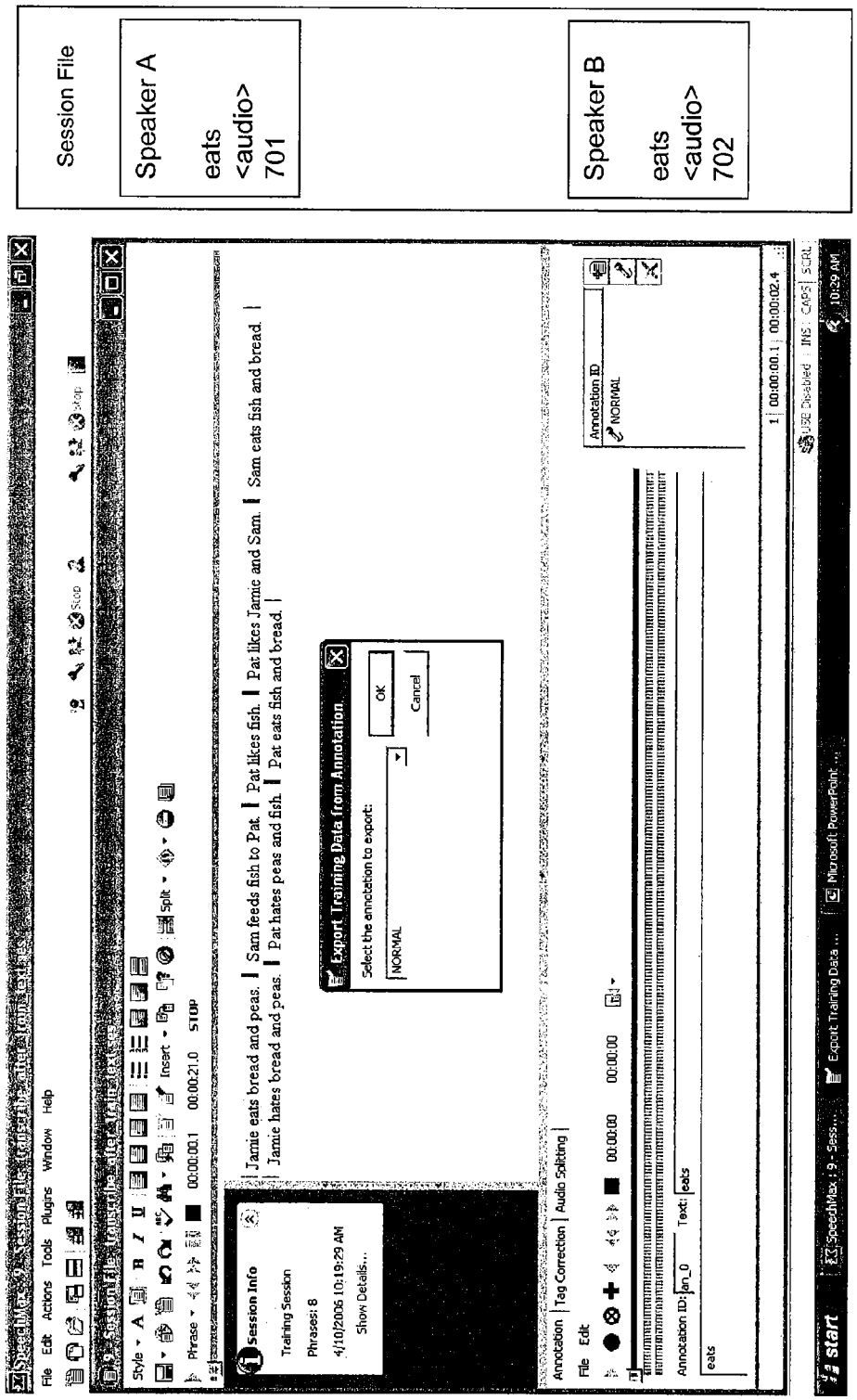

In review 206, the one or more session files 205 may be modified by one or more human operators, computer applications, or both. A user may choose to review by transcribed word or phrase using manual or automatic processing, and select speech recognition or text-to-speech to create audio or text annotation or both. In step 208 bounded data output 209, training data 210, or both are distributed (potentially including one or more postprocessed 207 session files, or part thereof, or other files) to human end users or other computers. Postprocessing 207 may be an optional step. Bounded data output 209 may include a variety of electronic files: audio-aligned text for free-form continuous, or structured dictation, as for data entry using electronic forms with tokens or "fill-in-the-blank" or other techniques; audio-aligned text for television captions or court reporting; audio books or other electronic file with synchronized text and audio, such as for recorded lectures, speeches, or witness testimony; or other session file 205 output from processing bounded text, audio, or image 201. In some instances, the bounded data output 208 may include data stored in session file annotations 701-705 (FIG. 7). Session file data may be extracted and saved individually to a database for later generation of web-accessible medical, business, or other reports. In some cases, data output, such as text only without aligned data input may be distributed for report generation.

The distribution 208 may include training data 210 to create or update the rules-based, statistical, probabilistic, or other models used by a pattern recognition program 215, such as speech recognition or other speech and language processing application. The training data 210 may result from generate annotation training from audio or text annotations (as shown in FIG. 7) by speech recognition or text-to-speech, or manually recorded human speech or keyboarded text, or both. The training data may include speech and text data for one or more speakers and be used to create or train one or more speech user profiles. FIG. 7 illustrates an example where speech and text data 700 is extracted and saved for one speaker, "speaker B" and used to train a speech user profile for speaker B. The training data 210 may be used for one or more pattern recognition programs not using a common boundary definition, such as that resulting in bounded output with a different boundary definition in step 220.

Data input 201 also may be optionally divided by different boundary definition 220 to create one or more session files 205 with or without creation of synchronized data output in step 203/204. In the reviewing step 206, there may be output synchronized from differently divided source data 201 using resegmenting and retagging techniques described in the co-pending parent patent application. For example, Dragon® NaturallySpeaking® speech recognition output may have a different number of utterances and not be synchronized to output from a Microsoft SAPI 5.x compliant speech recognition program. Further, read/write of the Dragon® DRA session file in the session file editor may require conversion of the DRA format to a compatible XML format. Such techniques are well-known to those skilled in the art and may require components distributed in a software development kit (SDK).

Creation of Text Annotation with Speech Recognition by Primary or Secondary User in Review During review 206 one or more second speakers may use speech recognition to correct or modify a primary speaker's previously-created session file 205. The primary speaker's speech input may have been transcribed by speech recognition and represent free-form dictation (including redictation), data entry by category or fill-in-the-blank, a book reading, testimony by a witness, character dialog on a television show, or a live news interview or other speech input 201. One particular review process 206 is illustrated with reference to FIG. 3 where a speaker B uses annotation mode to correct the text created from the speech of speaker A. In a preferred approach, a single session file includes the original text and audio entered by speaker A and the text and audio entered by speaker B as correction or other modification. It is contemplated that speaker A and speaker B session files could also be stored separately.

A. Continuous Free-Form Dictation

Review 206 of a previously created session file 205 created with continuous, free-form dictation by speaker A may be performed using a session file editor that supports audio and text annotation and speech recognition. The session file 205 is loaded, step 301 (FIG. 3), into the editor 160, as illustrated by the session file of speaker A loaded in the main read/write window of FIG. 5. This session file may represent audio-aligned text from manual transcription, automatic processing, or both 203/204, or it may represent a best result composite.

The speech recognition program may output text, a transcribed session file 205 in "transcribe" mode, or an untranscribed session file from boundary definition 202 with external segmentation application in "utterance" mode.

Figure 3:
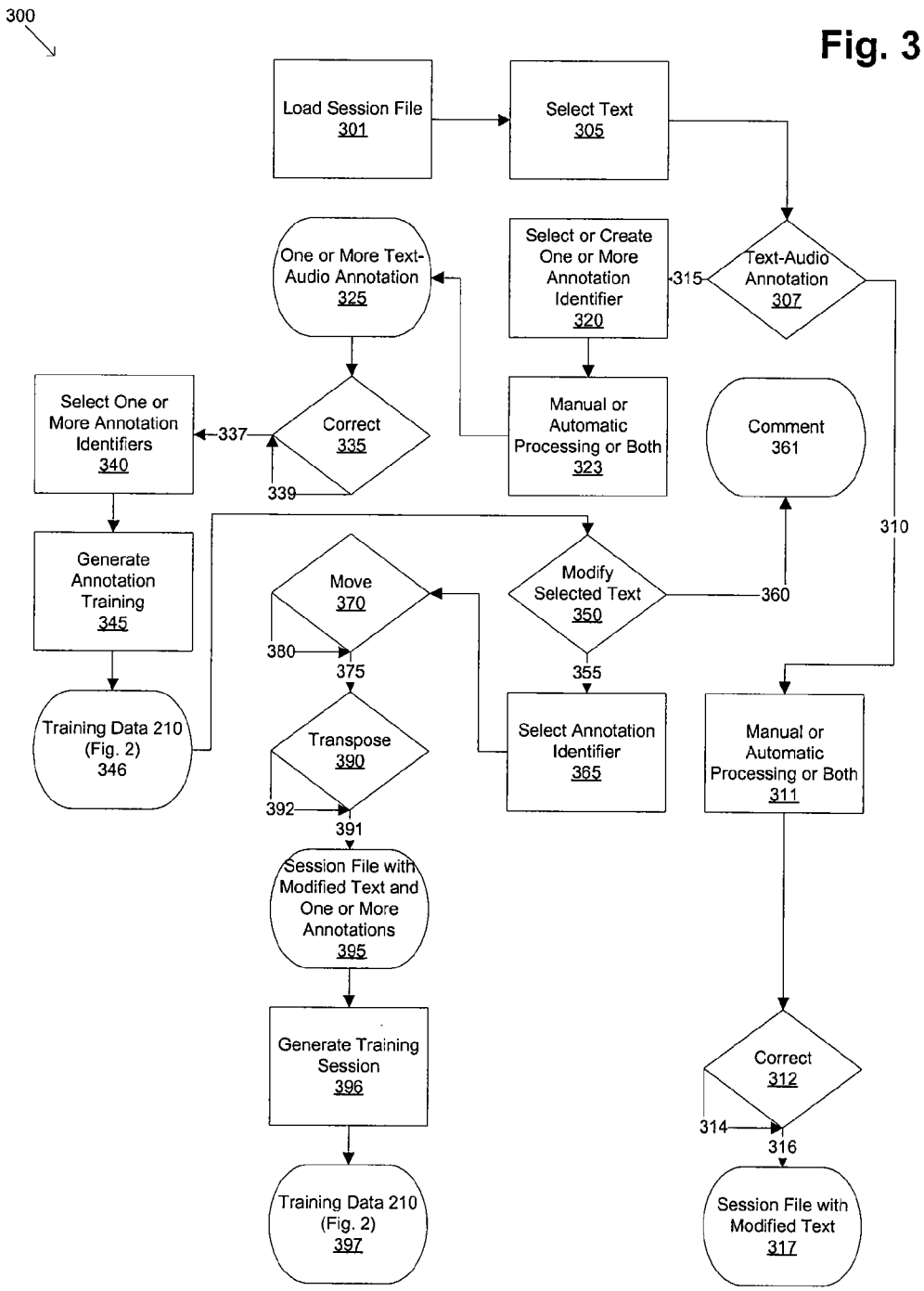
FIG. 3 is a flow diagram illustrating an overview of an exemplary embodiment of session file modification with speech recognition.

During review 206, the end user, such as speaker B, may select text (step 305) in the read/write window of the session file editor 160 and make text corrections or modifications (a) directly into the read/write window or (b) using audio and text annotation (step 307). Either approach may utilize speech recognition. As shown in FIG. 3, where audio and text annotation is used the process may open annotation dialog in association with the main read/write window (preferably at the bottom or top so as to only, at most, minimally obscure the main read/write window as illustrated by the user interface depicted in FIG. 5). The text selected in the main read/write window may be highlighted and color coded blue to indicate that markup with annotation including audio has been selected.

Figure 5:
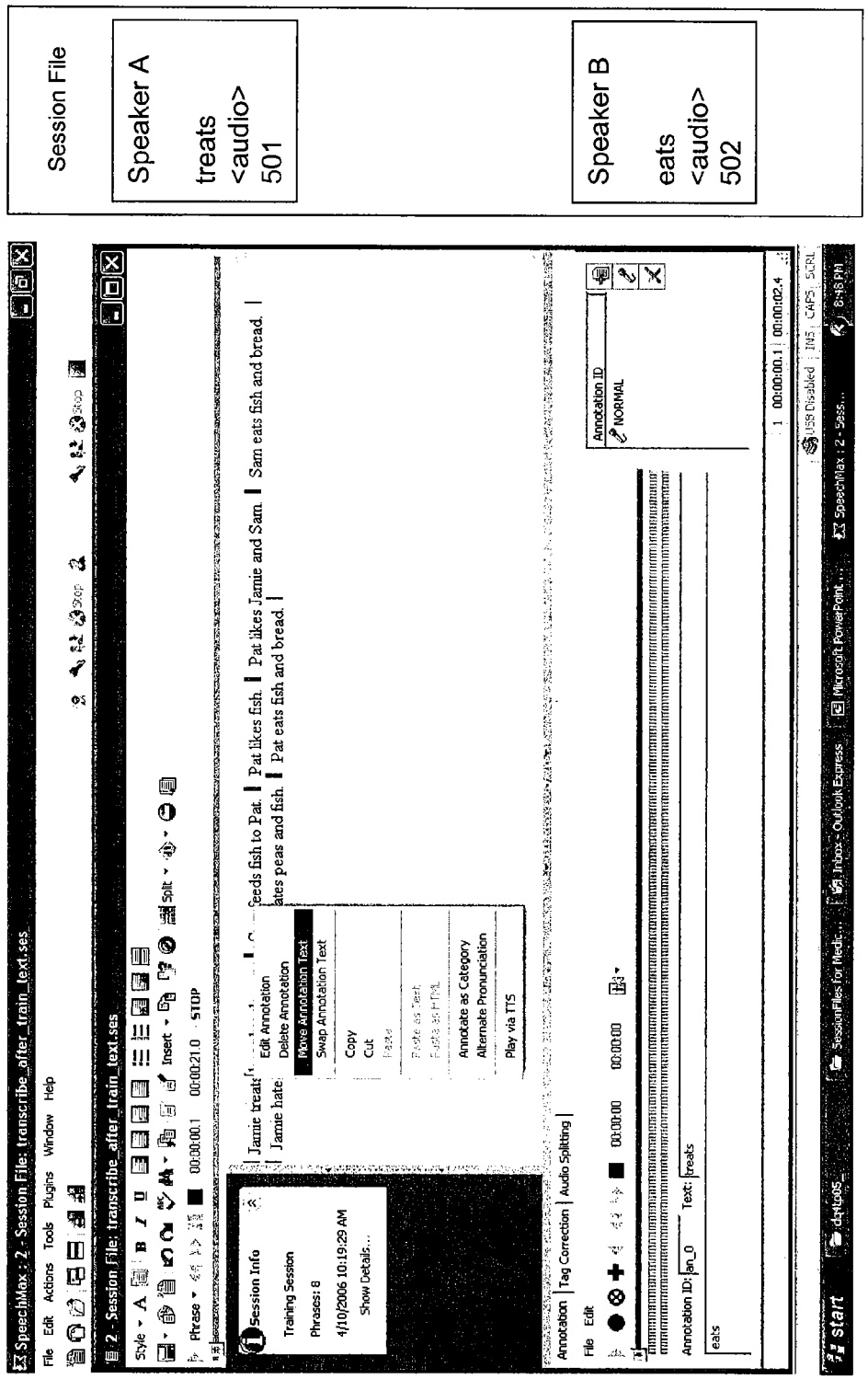
FIGS. 5, 6, and 7 illustrate an exemplary graphical user interface depicting the review of a free-form document using text and audio annotation, as well as the resulting audio text file pairs generated by the annotation and the potential merger of a speaker's annotations into a single file.
Figure 6:
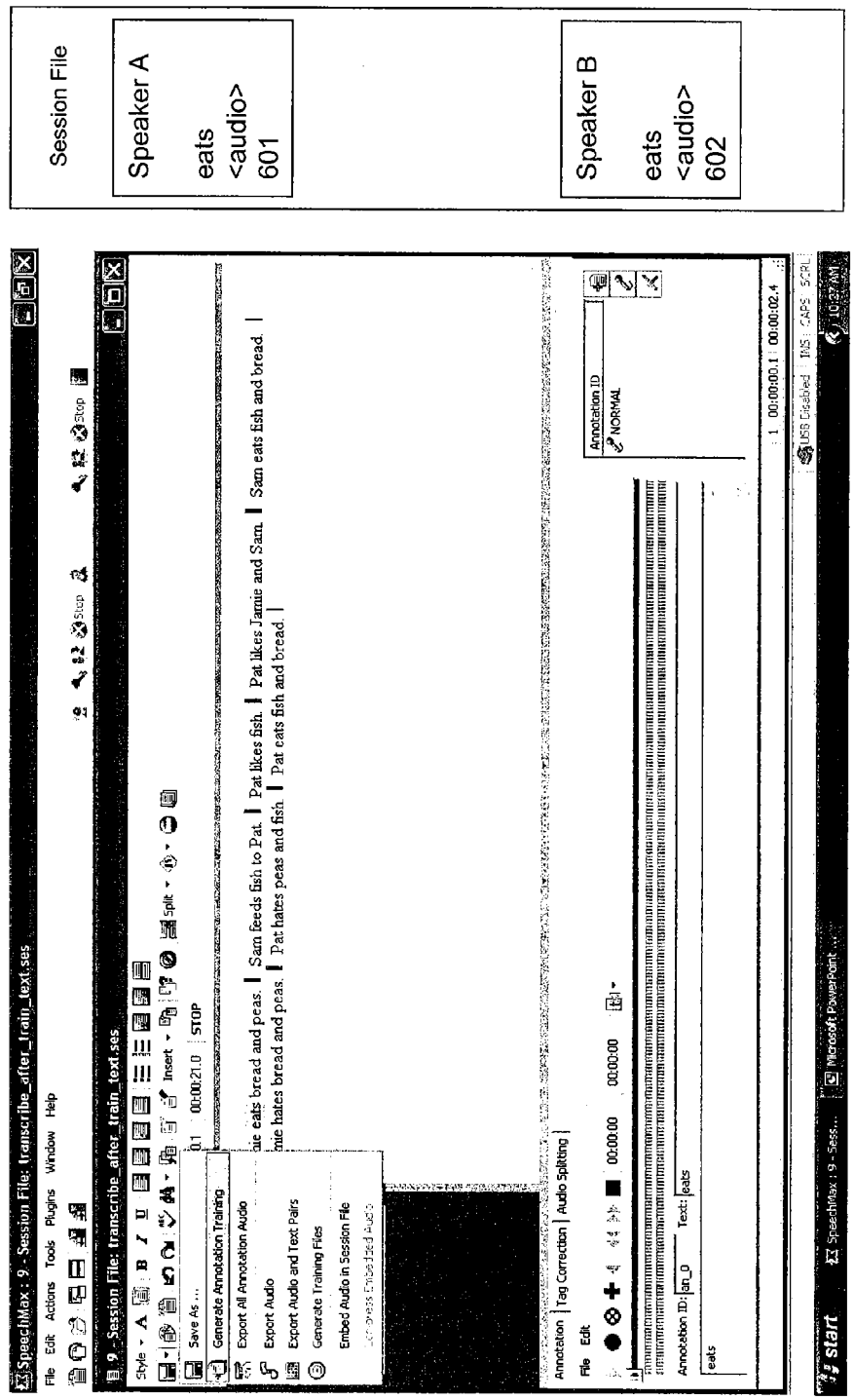

Alternatively, text-audio annotation 307 may not be selected (step 310). In one approach, manual or automatic processing or both (step 311)—such as keyboard entry or a speech recognition plugin—may be used to overwrite select text 305. In one approach, if created using speech recognition plugin, dictated audio is not saved where there is direct entry into the read/write window. The process also determines whether to correct 312 output text to verbatim text. Whether the decision is made to "yes" correct text 316 or "no" (don't correct text) 314 the result is a session file with modified text 317 in the read-write window. With the "no" option 314, the text may be edited to a nonverbatim result that is different than what speaker A said. In most instances, the correction represents verbatim text that corresponds exactly to the original speaker's audio and may be used to create a training session file 210. Otherwise a verbatim annotation may be used to create to generate training data 210, as was disclosed in relation to '671 application. Typically, when the original and correcting speaker are the same, as may be the case with real-time, interactive speech recognition, the speaker may elect to correct original transcription directly into the main read/write window. After decision 315 by process to select audio and text annotation, the process may select or create one or more annotation identifier 320. This will typically associate the audio and text annotation to a individual, but may associate it to a category. The identifier 320 may be created by keyboarding text into a row of the annotation identifier column in the annotation window. With speech recognition plugin/program, the annotation identifier will typically be a speaker, but select or create annotation identifier 320 may refer also to creation or selection of a particular category, such microphone audio. One or more users may audio or text annotate a given word or phrase in the read/write window. As shown in FIG. 5, the default may be for the text input by the correcting speaker to appear in the annotation window. However, as shown in FIGS. 5 and 6, it may be desirable to allow the end user to move the text newly created during review 206 into the main window (where the word annotation "eats" by speaker B replaced the word "treats" originally transcribed from speaker A's audio). The number of annotations created per selected text 305 may differ from selected text to selected text. In one approach, generation of verbatim text may be considered "normal." It may be designated as such in an annotation identifier column that supports user entry of configurable speaker names or categories. In FIGS. 5, 6, and 7, the "Normal" annotation ID corresponds to speaker B.

The process may proceed with manual or automatic processing or both 323 to create annotation of the selected text 305. With manual processing, an operator may audio annotate using the annotation window sound recorder. With automatic processing, such as with speech recognition plugin/program, the annotation sound recorder may playback the audio and save it as audio annotation and the text may be automatically displayed in the annotation window and saved as text annotation. After creation of one or more text-audio annotation 325, in a preferred approach, the process may determine 335 to correct the annotation in step 337, but may leave it uncorrected 339.

An operator may select one or more annotation identifiers 340 prior to creation of speech user profile training data 210 for a pattern recognition program 215 such as speech recognition. If there is a single annotating speaker correcting a primary speaker's text, there will typically be a single identifier, usually corresponding to the annotating person's name (such as "speaker B" illustrated in FIG. 7). In this case, all speaker's B audio and text annotations may be used as training data 210 for speaker B. Preferably, the changes made by speaker B create verbatim text representing exactly what speaker A said. In this case, the original audio from speaker A, plus the text, as modified by speaker B correction, may be used for training data 210 for speaker A. If there is more than one annotating speaker, there typically will be annotation training generated for each separate speaker, each of whom will typically be associated to an annotation identifier (e.g. speakers C, D, etc.).

In one approach, to create a speaker-dependent speech user profile, the end user selects one or more annotation identifiers (step 340) that groups annotations by speaker. In another approach, text and audio annotation pairs from two or more speakers may be grouped together to create a speaker-independent speech user profile. After select one or more annotation identifiers 340 has been completed for one or more speakers or categories, the process may generate annotation training in step 345 for each speaker or category, a process analogous to generate training session file 396 for the primary speaker. A similar technique is disclosed in the '671 application. This produces training data 210 for a secondary speaker (step 346).

As shown in FIG. 5 the audio-text pair for each audio annotation by speaker B is saved as a file 502. However, the session file for speaker A associates the incorrect text ("treats" in this case) to the audio tag 501 for the original audio.

The generate annotation training 345 step for speaker B begins with the determination of which audio-text pairs, based upon annotation identifier, will be exported for training data 210 in step 346. In FIG. 7, the "normal" category has been selected, corresponding to speaker B.

Figure 10A:
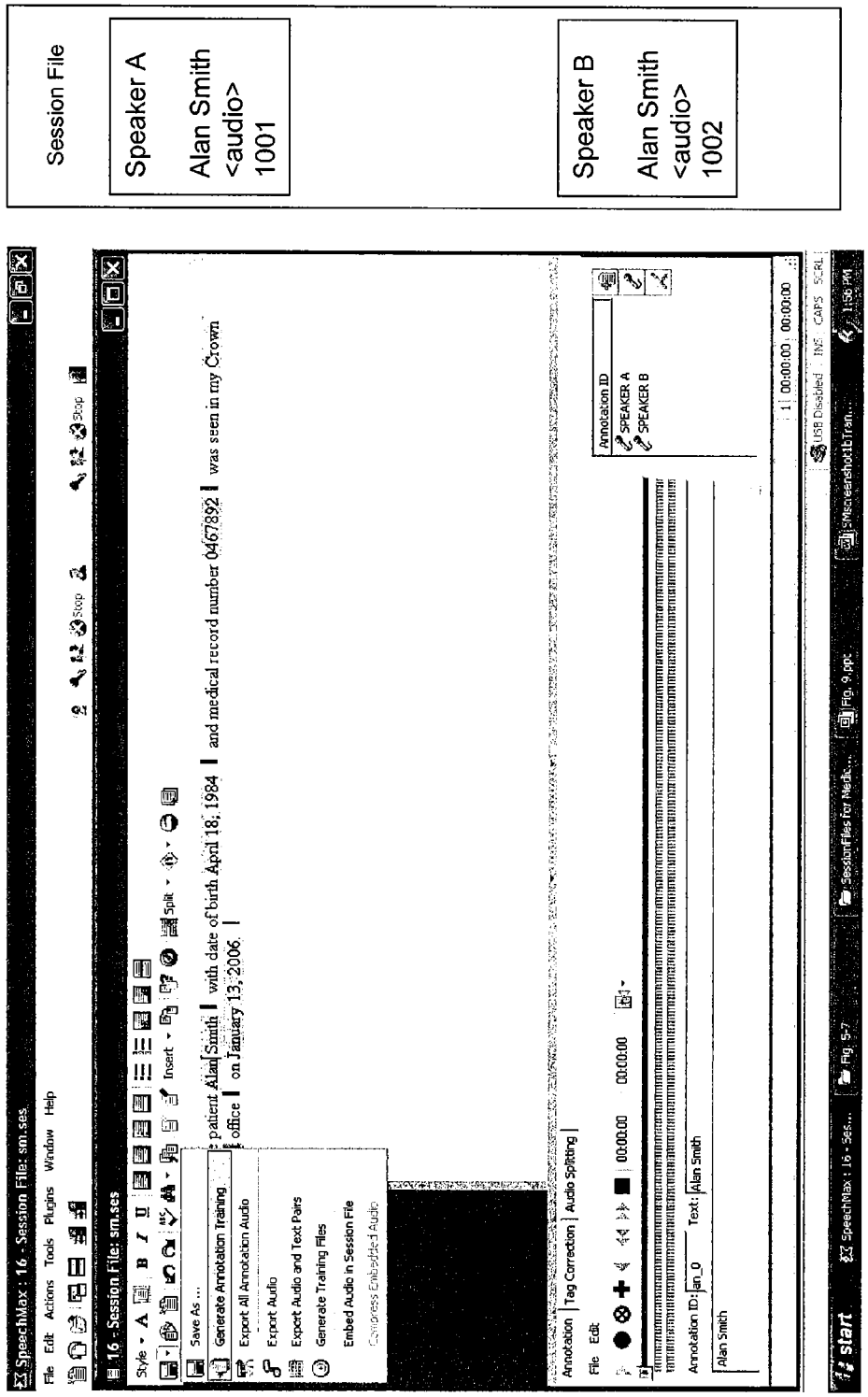
Figure 10B:
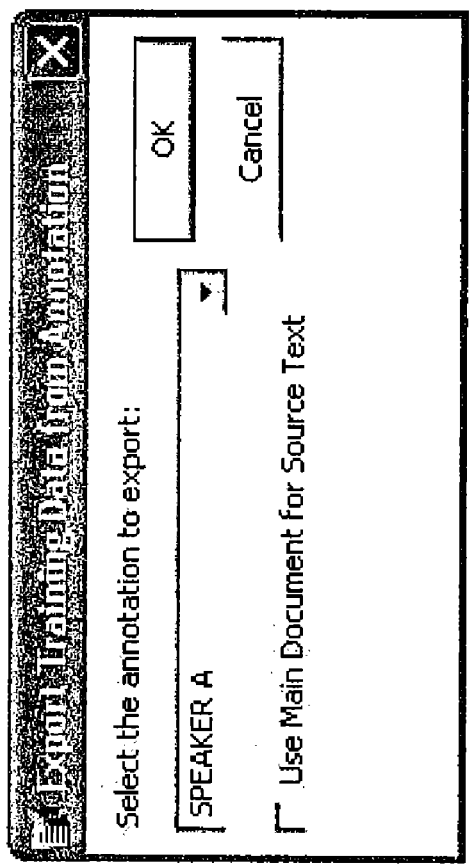
FIG. 10B illustrates an exemplary graphical user interface depicting the ability to select the source text for annotation training.

FIG. 10 depicts the pull-down menu to start a process by which all audio annotation files are concatenated or otherwise merged for a given annotation identifier (e.g., a speaker) into a single file. This single file, in one approach, has each merged audio annotation separated by one second of silence. The newly-created audio file as data input 201 may be segmented, as in division data input into separate units 202, and undergo manual or automatic processing or both 203/204. The one or more session files 205 may be further reviewed 206 themselves. Since the export is annotation identifier specific, each of one or more annotations for each of two or more speakers could be merged into separate audio files and transcribed manually or automatically or both. If the audio annotation was entered using sound recorder alone, the separate audio annotations for a given annotation identifier may be transcribed by one or more manual or automatic processing methods or both 203/204 to create one or more session files 205. In addition, if the audio annotation was entered using a speech recognition plug-in/program, the separate audio annotations may also be exported for further transcription by one or more human or automated processes.

In some instances, the process may elect not to generate annotation training 345. In these cases, there may be insufficient material for training, which may require hours of good-quality acoustic data.

After generate annotation training in step 345 and creation of training data 210 in step 346, the process may determine 350 whether to modify the transcribed session file word or phrase highlighted in select text 305. In some instances, no modification is required because the annotation may have been entered as a comment—or text for other purpose, not as a means to correct primary speaker text. In this instance, the process may select "no" in step 360 and create an audio-aligned text comment 361. Examples may include review of a student's work by a teacher, comments on a junior associate's draft document by a senior partner, editing of a medical student's medical history by a senior physician, rework of a screen writer's dialogue by a director, and so on. Here the second speaker's (e.g., speaker B's) audio-aligned text may generate annotation training 345 independent of the first speaker's (e.g., speaker A's) audio-text data that may be used in generate training session 396 for training data 210.

If the process selects "yes" in step 355, the process may select annotation identifier 365 to determine which one or more annotations will be entered into selected text 303. In one approach, the operator may determine 370 whether to move 380 single instance of annotation text into the read/write window to overwrite/replace select text 305 (as illustrated by menu item in FIG. 8). The operator may also determine 390 whether to transpose text, which swaps the original select text 305 with the text annotation. The annotation text moves into the main read/write window, and the main window text moves into the annotation section. An operator may also move 375 or transpose 391 all annotations for a given annotation ID by selecting an option in a user interface (not shown). To substitute corrected text into the main read/write window for the select text 305 (as shown by replacing "treats" with "eats" in FIG. 6), move 375 or transpose 395 is selected. If the process decides "no" with options 380 and 392—not to move or transpose—the audio-text annotation effectively becomes a comment, as if "no" option 360 were previously selected.

In one approach, the display text in the read/write window is entered as verbatim annotation, unless the verbatim annotation is changed to differ from the final, display text, as disclosed in the '671 application. After move 375 or transpose 395 is performed to correct initial text, generate training session 396 with original speaker audio may be performed to create training data 210 (step 397) for pattern recognition program 215.

In a further related approach (not shown), an operator may move 375 or transpose 391 text annotations into a new, separate window. If the transpose 391 is to the same window, the text will be switched for all same-identifier text annotations and corresponding read/write window text. If transpose 391 is to a new window, the annotation text may be placed into the main read/write window, and the original read/write window text into a new annotation. If the transpose 391 is to a new window, in one approach, an option may also be available transpose 319 text annotation only into a main read/write window with no annotation markup. This may effectively create a text file, but, in one approach, is not supported with transpose 391 to same window of original session file, since text-only transposition that created a text file would conflict with markup associated to the original session file.

Alternatively, using the speech recognition plugin/program, the process also may determine to append a transcribed audio file into a text or session file (not shown). This appends audio-aligned text to the original session file. In one approach, the process may start with an audio annotate process (as disclosed in the parent, co-pending patent application), export audio from the annotation window, generate an untranscribed session file from boundary definition 202 using speech recognition in utterance mode, and append each of segments of the boundary-defined 202 untranscribed session file With speech recognition plugin/program transcribe audio file feature, the appended untranscribed session file segments may be converted to audio-aligned text. The same append/recognition process may be used to add audio-aligned text to any session file consisting of bounded data, such as speech, nonspeech audio, image, or text data input 201.

In some cases, load file session file 301 may load text-aligned text, from human or machine translation, phonetic conversion, text comparison, or other text-based processes. With text-aligned translation, each word, phrase, sentence, or other unit of the target (output) translated text may be aligned to untranslated source (input) text. Each phrase or sentence of the source (input) text may be displayed using XML markup techniques as a text annotation. In one approach, if the target (output) text is in the read/write window, the speech recognition plugin/program may be used to correct the translation by selecting the read/write text and creating an audio and text annotation.

Using move 375 or transpose 391, the corrected translation may be inserted into the main read/write window. The source text and target text also may be used as training data 210 for a machine translation pattern recognition program 215. The audio-text pair from the speech recognition correction may also be used as training data 210 for a speech recognition pattern recognition 215. One or more other session files 205 derived from other text, audio, or image data input 201 could also be loaded 301 and text and audio annotated.

In another approach, data input 201, e.g., courtroom or television speech, may be divided into separate units 202 and transcribed by manual or automatic processing or both 203/204. The resulting one or more transcribed session files 205 may be sorted into separate segments and distributed to one or more operators for review.

The text may be transcribed centrally to create a transcribed session file 205. The '671 application describes parsing (sort) of one or more untranscribed or transcribed session files, distribution of one or more segments to one or more remote operators, and sequential merge (unsort) with review 206, postprocessing 207, and distribution 208. If the remote transcriber receives segments of a transcribed session file 205, the first step may be load session file 301. During review 206, the operator may select text 305 in the read/write window, create audio and text annotation, and return corrected transcribed session file segments for sequential merge. This may be followed by post processing 207 that may extract text for video or television display and distribution 208. Training data 210 may be obtained for one or more pattern recognition program 215, such as speaker-dependent, speaker-independent, or speaker-independent speaker-adaptive speech recognition, for both the primary speaker and remote transcriber.

In a related approach, the audio 201 may be segmented at a central location with division of data input into separate units 202. Using techniques well-known to those skilled in the art with the present specifications before them, each audio segment may be streamed to a remote operator for manual or automatic processing or both 203/204 who listens to the audio using a full duplex sound card. The transcription by a remote TV captionist or court reporter may be entered into sequential segments of an empty session file to create one or more session files 205. This may be returned to the central site for review 206 by a supervisor editor with any required correction entered manually by speech recognition plug-in/program or manually using a variety of techniques described in the current or co-pending application.

B. Structured Dictation

Figure 8:
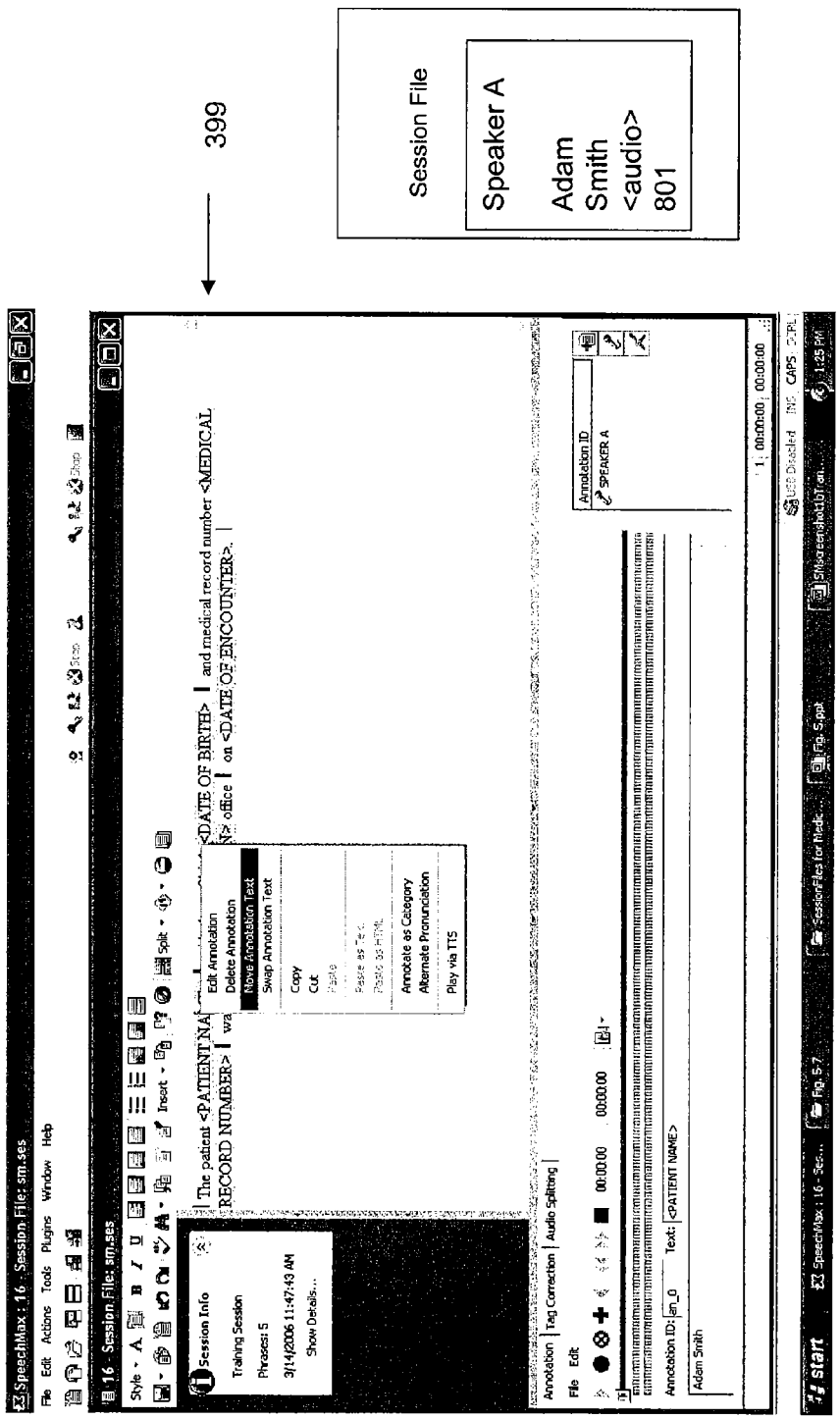
FIGS. 8, 9, and 10A illustrate an exemplary graphical user interface depicting the review of a structured document using text and audio annotation, as well as the resulting audio text file pairs generated by the annotation and the potential merger of a speaker's annotations into a single file.

In one approach shown in FIG. 8, the process 200 may use a session file data entry template. Data input 201 is divided into separate units (boundary definition) 202 for manual or automatic processing or both 203/204 to create one or more session files 205 that contain data for entry into a form. At least one of these session files may represent a best result composite and may be more accurate than any of other single session file 205.

In one approach, the bounded data output 202, e.g., text, that is aligned to the original data input 201, e.g., audio, is displayed for convenience within segments of the session file data entry template. The aligned input and output will typically represent the same information in a different data format about each of the data categories within the form. Using methods described in this disclosure, the session file data entry template may be created by a business or medical secretary, paralegal, or other operator from a previously created fill-in-the-blank text file or other data entry form. This form may originally have been created on a word processor and printed for completion with pen or pencil.

In one approach, tokens of a form may represent field names for data entry in health care, law, manufacturing, insurance, law enforcement, or other activities. As one example, a fill-in-the-blank or other data entry form may have been used by an examining physician or other health worker to enter data for an office visit. The tokens might indicate what information the user was expected to dictate or enter into the paper form.

As depicted in FIG. 8 in this setting, the first sentence of a session file template created from a preexisting, routine medical report form might include a number of tokens such as <PATIENT NAME>, <DATE OF BIRTH>, <MEDICAL RECORD NUMBER>, <LOCATION>, <DATE OF ENCOUNTER>, and so on. In this example, the first sentence of the structured, data entry form might read: "The patient <PATIENT NAME> with date of birth <DATE OF BIRTH> and medical record number <MEDICAL RECORD NUMBER> was seen in my <LOCATION> office on <DATE OF ENCOUNTER>." The text file template may include other tokens for entry of other appropriate data by the examining physician, such as chief complaint, history of present illness, review of systems, physical findings, laboratory values, assessment and plan, and others.

To create a session file data entry template, the process may begin by loading a text file for a preexisting template into the session file editor, creating a token for each blank or data category in the create or edit text file, and text annotating each tokenized category corresponding to create a session file with text annotation markup. The operator or process creating the annotations may select or create a unique annotation identifier. Alternatively, to create a text to load, the operator may create or edit a text file in the session file editor with manual keyboard entry, speech recognition plugin/program, bar code scanner, or other text keyboard entry.

Using split text, text and audio split, create empty session file (one approach to each sub-process is disclosed in the co-pending parent patent application Ser. No. 11/203,671), or other techniques, an operator add vertical markings separating phrases containing text-annotated tokens for display when opened in the main read/write window of the session file editor. An example of one approach is as follows: |The patient <PATIENT NAME>| with date of birth <DATE OF BIRTH>| and medical record number <MEDICAL RECORD NUMBER>| was seen in my <LOCATION> office| on <DATE OF ENCOUNTER>.|

In a preferred approach, a token or blank in text may be selected for markup by selecting audio annotation without actually recording audio into the annotation window. With the markup (displayed by colored highlighting in read/write window), the software may be configured to advance directly to next/previous word or blank using the same configuration panel that supports tab to next/previous difference, as previously disclosed in the U.S. Ser. No. 11/203,671 application, filed on Aug. 12, 2005 (e.g. NextDiff and PreviousDiff were assigned to the "Tab" and "Shift Tab" keys, respectively). Here, these could be statically or dynamically assigned to next/previous highlighted text or blank, respectively. Consequently, a token or blank may be marked initially and a user may later navigate to the highlighted text or blank and then enter audio, text, or both (as with speech recognition) and proceed to the next one or go back to the previous one.

In another approach, the speaker may use keyboard macros assigned to tab key and shift+tab of a keyboard, as described in FIG. 1. Using these macros, the user may navigate "next" and "previous" to each segment.

The next step in the process may be creation of audio and text annotations for the tokens as also depicted in FIG. 8. In one approach, a dictating physician, in load session file step 301, may load the data entry session file template into the session file editor and follow the steps in process 300 301 through 325. In step 325, the physician may audio and text 529 annotate each token sequentially with manual or automatic processing or both. In one approach, the dictating physician may use the speech recognition plugin/program and continue the process until complete.

As shown by FIG. 8, using speech recognition plugin/program, speaker A has entered audio-text annotation of "Adam Smith" for <PATIENT NAME> when he actually said "Alan Smith". This represents a misrecognition by the speech recognition plugin/program. In one approach, the dictating physician does not make the correction, but may elect to delegate the correction of this and any other errors to a correctionist speaker B using the speech recognition plugin/program. FIG. 8 further shows the "move annotation text" menu item that can be used to replace data entry session file template text with the annotation text. In one approach, this may be performed, as in this example, by the delegated correctionist speaker B. As further shown in FIG. 8, the phrase 801 "Adam Smith" is associated to annotation <audio> prior to any correction by speaker B. In one approach, the audio for each annotation may be stored as a separate file.

Figure 9:
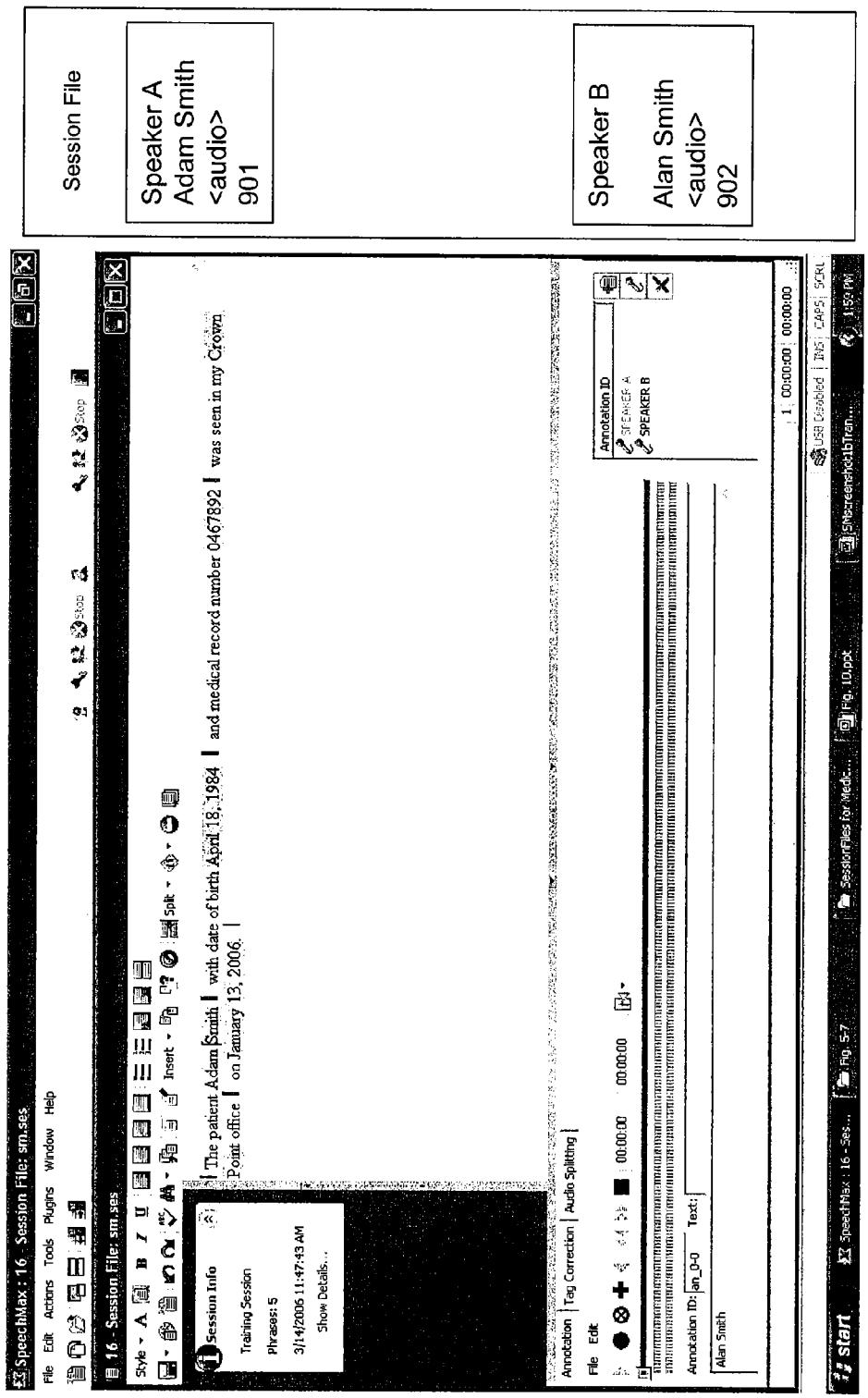

As further shown in FIG. 9, after completion of the task by speaker A, the text resulting from structured dictation speech input 201 for session file data entry template might consist of "Adam Smith," "Apr. 18, 1984," "0467892," "Crown Point," and "Jan. 13, 2006." In this example, "Adam Smith" represents a misrecognition of the uttered name "Alan Smith". As shown by FIG. 9, session file associates text "Adam Smith" with annotation audio 901. Each text annotation, consisting of text corresponding to the tokens in the form, may typically be associated to an audio annotation file for that text the recognized text "Adam Smith" may be corrected in the audio and text annotation window with the speech recognition plugin/program by the original speaker, or, as depicted in FIG. 9, by a second speaker B. In this case, the session file for speaker B may consist of one or more audio-text pairs corresponding to audio and correction text. With respect to "Adam Smith," the correct text, as shown in the text annotation window, "Alan Smith" is associated to speaker B audio 902. In this example, no other corrections were necessary.

The process may determine 335 whether speaker B should correct the text created by speaker A to replace the data session template 399 tokens. If "yes," (step 337), speaker B may move annotation text. As depicted in FIG. 10, the resulting corrected text may be displayed: |The patient Alan Smith| with date of birth Apr. 18, 1984| and medical record number 0467892| was seen in my Crown Point office| on Jan. 13, 2006.| Speaker B may then select one or more annotation identifiers 340 to generate annotation training for speaker B's audio-text pairs. These audio-text pairs associated to the correcting speaker B may be used for training data 210 (step 346). Similarly, audio-text pairs associated to the original speaker A may be used for training data 210 (step 346) for that speaker's speech user profile.

In one approach to creating training data 210 (step for 346) for speaker A, after creation of training data for speaker B in step 346, the process decides 335 to correct ("yes" option 337) speaker A annotation. This may be performed by copying and pasting the dictated verbatim text ("Alan Smith" and so on) from the main read/write window into the annotation window for speaker A for each annotation. In this example, "Adam Smith" becomes "Alan Smith". In this example, this is the only annotation text requiring correction. After each of the annotations have been converted to verbatim, the process may select one or more annotation identifiers, as in FIG. 10, for speaker A under "Annotation ID". Selecting the menu option, as in FIG. 10A, may generate annotation training 345 for speaker A and training data 210 (step 346). The process may then determine whether to modify selected text 350 (the copied verbatim text) in the main/read window. In one approach, the process determines "no" (step 360) and generates, in effect, a comment 361 consisting of the annotation text that matches the verbatim text in the main read/write window.

In another approach, generate annotation training 345 step may permit the user to select text from the main read/write window to train the audio associated to a particular speaker, such as speaker A. In one approach, a dialog, as displayed in FIG. 10B, has a check box. If checked, text from the main read/write window is used for generate annotation training 345. This option permits the user to select corrected verbatim text of the read/write window to generate the training data 210, not the nonverbatim text annotation created by a speaker. If unchecked, the text in the annotation window is used. In another approach (not shown), after creation of final bounded data output for distribution 208, the process may transpose the verbatim read/write window text into the annotation window and place the nonverbatim text into the read/write window. The process may then use the verbatim annotation text to generate annotation training 345 for speaker A.

After correction during the review 206 stage, the process may remove the visually identifiable boundary markings using save as in the session file editor 160 and selecting TXT, RTF, HTML, or VERBATIM: The patient Alan Smith with date of birth Apr. 18, 1984 and medical record number 0467892 was seen in my Crown Point office on Jan. 13, 2006.

Postprocessing 207 may include data extraction from XML session file markup or from the document itself. Data extraction techniques are well known to those skilled in the art. The extracted data may be reassembled into a web-accessible or other document or report as part of postprocessing 207. In one approach, postprocessing is an optional step. Alternatively, in distribution 208 (FIG. 2), the session file bounded data output 209 may be transmitted to independent operators for data extraction and web display.

Figure 11:
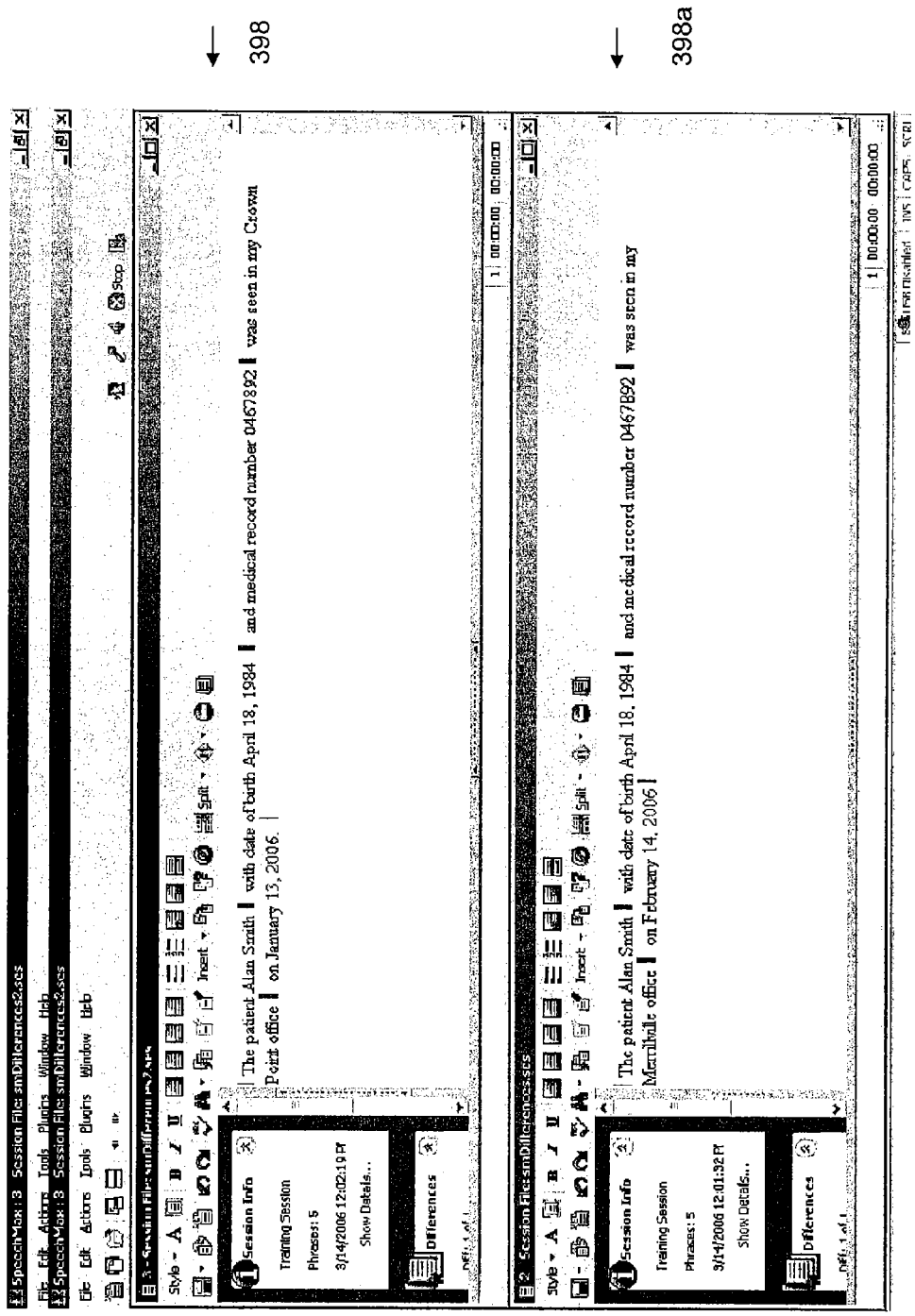
FIGS. 11 and 12 illustrates an exemplary graphical user interface for comparing two structured documents toward reviewing the difference between the documents.
Figure 12:
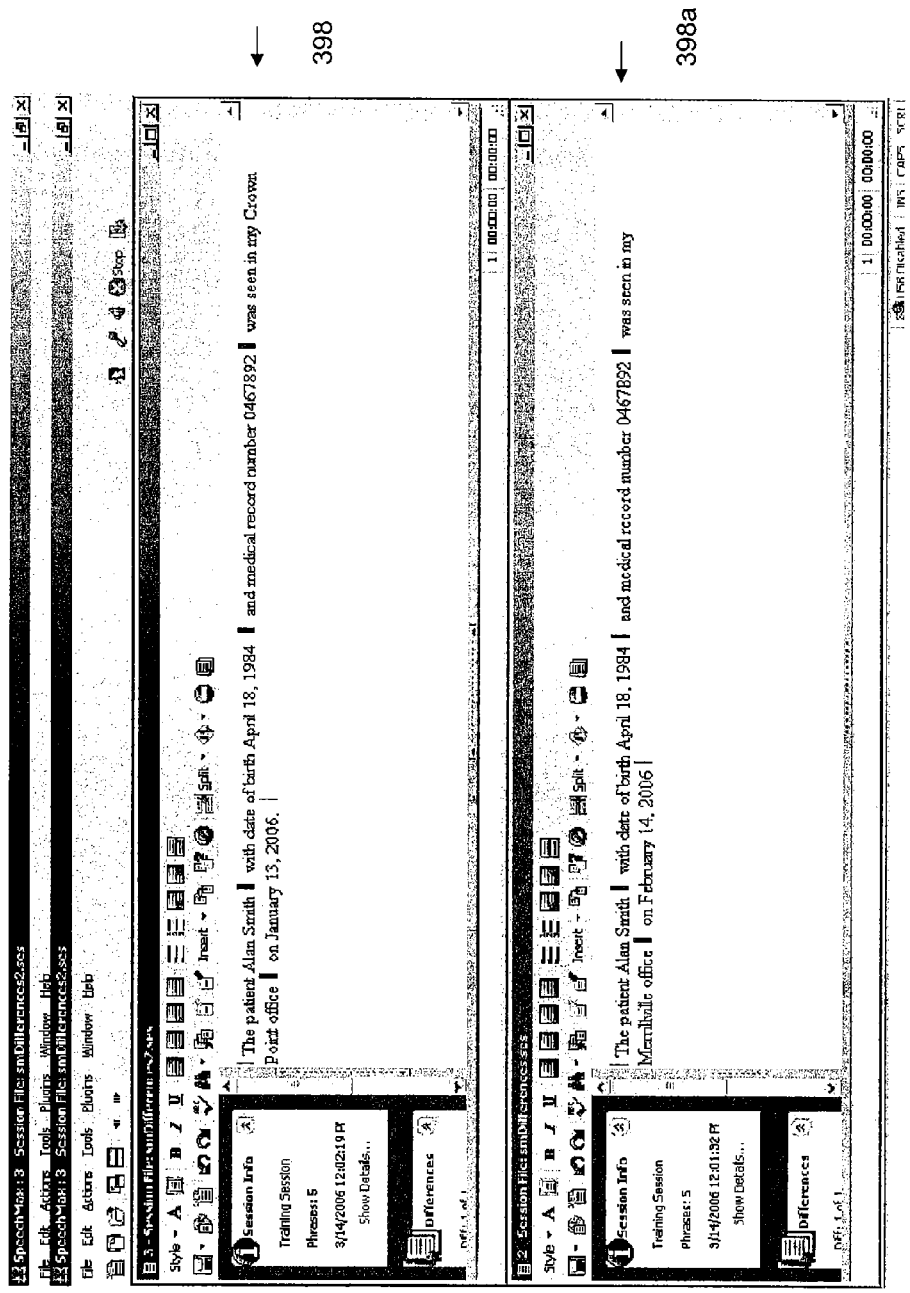

In another related approach, as illustrated through an example shown in FIG. 11, text compare may be used with two or more synchronized session files for evaluation of data. The process may load one or more session files, consisting of the two previous reports that differ only by entered encounter location and date. Using text compare, the operator may find differences in the two reports. FIG. 12 illustrates the results of such a comparison for the example of FIG. 11. The first sentence in the first completed session file data entry template 398 might be: |The patient Alan Smith| with date of birth Apr. 18, 1984| and medical record number 0467892| was seen in my Crown Point office| on Jan. 13, 2006.| Another patient visit might result in the following completed template session file 398a: |The patient Alan Smith| with date of birth Apr. 18, 1984| and medical record number 0467892| was seen in my Merrillville office| on Feb. 14, 2006.| Thus, the differences are highlighted as "Crown Point" vs. "Merrillville" and "Jan. 13, 2006" vs. Feb. 14, 2006. As would be understood by those of ordinary skill in the art having the present specification before them, other methods can be used for highlighting the differences between the two text instances Since there are equal number of segments in the example of FIGS. 11 and 12, the operator may readily use tab synchronization (tab and shift+tab keys) to move to next and previous differences. As may be readily appreciated, the more data entry is structured, the more quickly possible differences in data with text compare between corresponding segments may be visualized. However, structured text is not required to benefit from text compare, it may also be performed across segments. Alternatively, a synchronize function (one possible approach to which is disclosed in the 'xxf application Ser. No. 11/203,671) may be used to create equal number of segments in two or more session files to facilitate comparison by segment with tabbing.

Audio and text annotation with the speech recognition and text-to-speech plug-ins/programs may be used in various industries and activities for standardized data entry, e.g., law, law enforcement, insurance, education, manufacturing, foreign language pronunciation and others. For example, a teacher may create a session file data entry template for testing. A student may enter test answers using speech recognition or text-to-speech plugins/programs with a session file data entry template. In one approach, the test distributed to each student will have an equal number of segments. The teacher may view each of the student's completed data entry templates and session file answer key after load one or more session files, navigate sequentially through segments for each session file using "Tab" key in the multiwindow session file editor, and text compare results against an index, such as the session file answer key, a best result composite session file (205) (that may reflect frequency of answers to each test question), or a particular student's answers.

The annotation techniques may also be used in document assembly and document automation where large blocks of text, often boilerplate, are assembled. By creating one or more session files and converting each of the one or more session files into text, these may be combined to create a completed final document. Data entry into one or more of the separate component blocks may be accomplished with manual or automatic processing or both 203/204 (FIG. 2), such as using keyboarding or speech recognition.

C. Audio Books, Lectures, and Speeches

Audio books may be distributed as CD or tape cassette for playback in a variety of locations. By time-aligning the recorded text, a user may potentially listen to the audio book on electronic media (such as a CD), note the end-point time stamp, find the end-point on a file opened in a software media player or external device, and begin reading the electronic text or resume listening to it.

Figure 13:
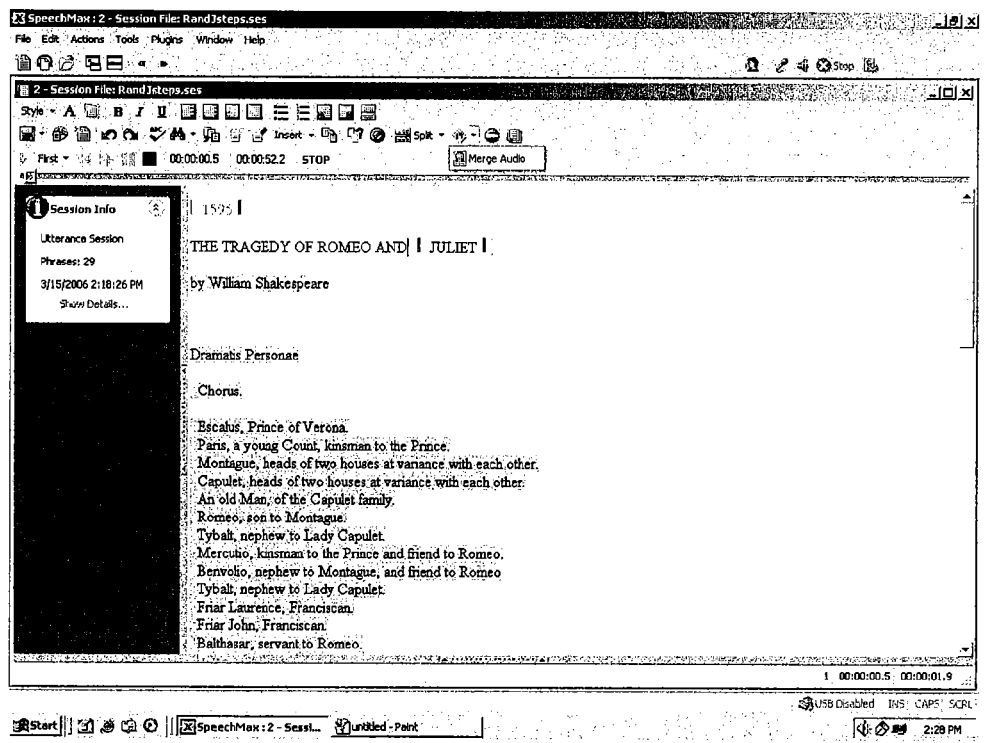
FIGS. 13, 14, 15 and 16 illustrate an exemplary graphical user interface for integrating audio and text for a book, song, media article and other text-audio paired content wherein audio can be aligned and synchronized, non-dictated text marked, and text optionally annotated.

Data input 201, e.g., an audio file created by a professional reader, may be divided into separate units 202, e.g., divided into utterances with an external segmentation application, such as that described in the 671 application. This external segmentation application is analogous to the untranscribed mode of the speech recognition plugin/program of the prior application '671. The segmented audio 202 may undergo manual or automatic processing or both 203/204, e.g., a human operator aligning each audio segment to previously transcribed associated text, to create one or more session files 205. As previously described in the '671 application, during the "splitting" process, an operator may load one or more verbatim text files and merge an audio file to be associated therewith (see, e.g. FIG. 13), playback audio aligned to each segment of the untranscribed session file, and align each audio segment to text with split text, text and audio split, and text and audio merge.

Figure 14:
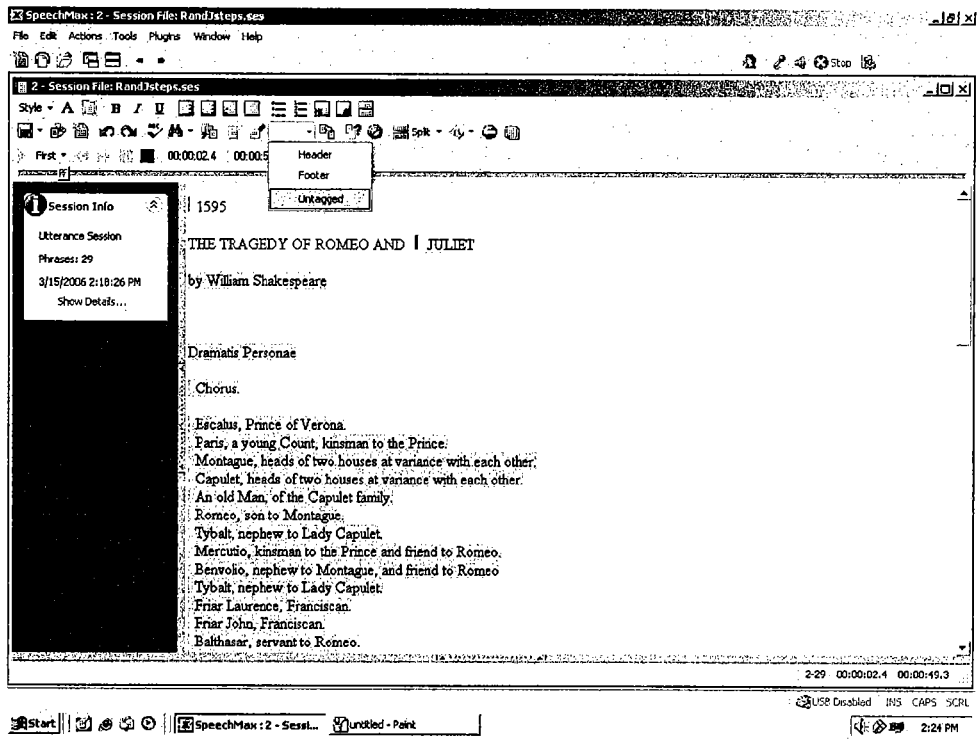
Figure 15:
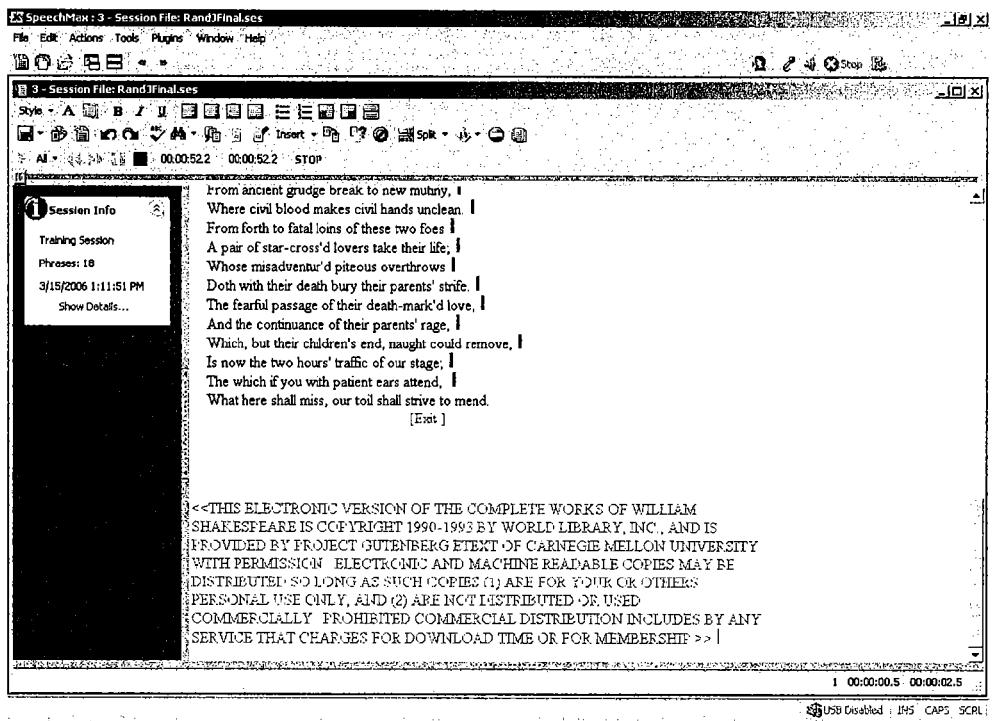
Figure 16:
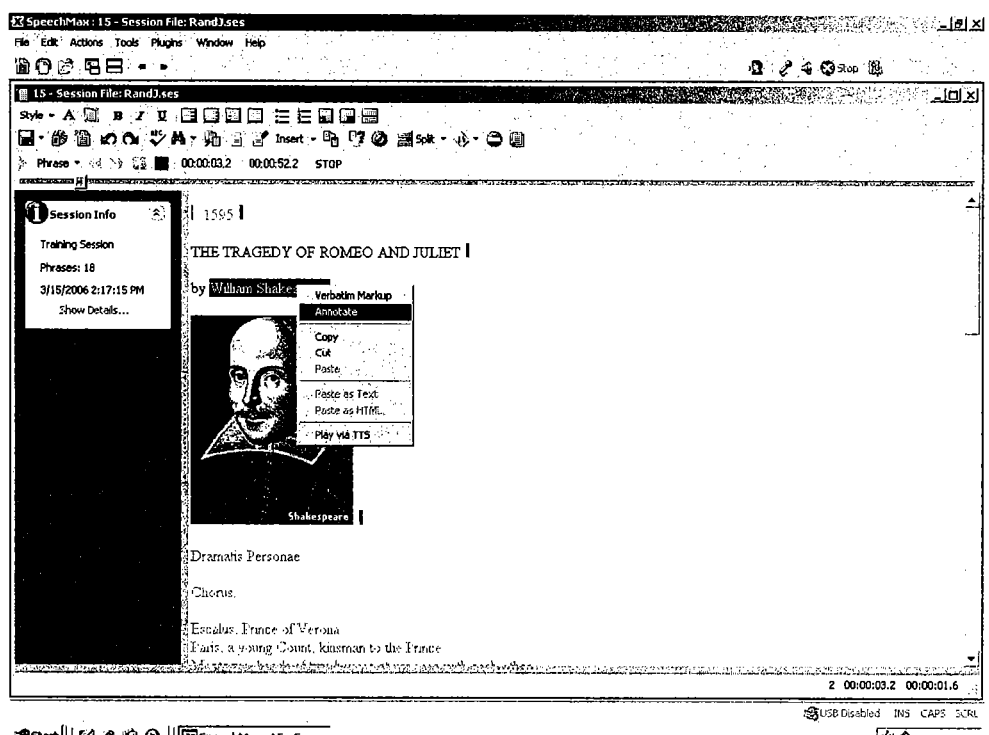

In a further related extension of this approach, an operator may import one or more RTF, HTML, or TXT text into the session file editor 160 and load one or more text files. As illustrated in FIG. 13 through 16 for the Shakespeare play "THE TRAGEDY OF ROMEO AND JULIET," this may include verbatim text, but also may include nonverbatim or nondictated text, such as punctuation, carriage returns, or formatting, such as bold, italics, and underline, or nontext, such as tables, bullets, bullet numbering, justification, increase indent, decrease indent, graphics, or images. As shown in FIG. 14, the character listing (i.e. "Dramatis Personae") of the play may be designated nondictated text. Similarly stage directions may also be designated as nondictated text. FIG. 15 illustrates the segmentation of dictated speech. FIG. 16 illustrates the relation of graphics or images to the present technique. The elements displayed generally depend upon the file format selected.

An operator may use playback aligned audio functionality to listen to the first utterance audio from the untranscribed session file corresponding to the loaded file. After listening to audio playback and reviewing the text, in the split text step, the operator may place the cursor in the text corresponding to the end of the utterance and mark the split by function key or other approach. Subsequently, the operator may listen to the next utterance, split text, and sequentially continue until the process is complete (see FIG. 15 showing one exemplary segmentation of a portion of the initial speech from "Romeo and Juliet." Each text segment may have a time stamp based upon start time and duration of the corresponding utterance that may be associated to video playback by a media player.

In this approach, verbatim and nonverbatim text and non-dictated element may be aligned to the corresponding audio utterance by utterance even though, technically, the recorded audio does not correspond identically to the text. For example, the author does not read "period" or "comma" for punctuation or indicate the carriage return or formatting. Moreover, the segment may include nondictated text or nontext if supported by the file format.

As shown in FIG. 14, the operator may mark non-dictated text. In one approach, some or all the non-dictated text may be assigned a different font color and may be included in segments with audio-aligned text. Other material that is not read by the professional reader, such as a table of contents, index, bibliography, graphics, tables, and charts, may be color coded as nondictated in the session file editor 160.

With these visual cues, a reader of the electronic file, such as audio book, may readily know that some material within the segment is audio-aligned, while other material is not, e.g., table of contents, bibliographies, and so on. In some cases, it may be easier to read and review the electronic file by making some or all of the non-dictated text the same color as the dictated text. For purposes of permitting the reader to move from end-point of time-stamped audio file presentation to same point for electronic text viewing, approximate synchronization of the audio with the text and non-text, non-dictated elements will usually be sufficient. As shown in FIG. 16, graphics may be included in the file and designated as non-dictation text and furthermore those graphics (as may any of the non-dictated text) may have a text and/or audio annotation associated with it, such that the annotation may not be played during playback of the main audio file, but could be separately selected for playback. The techniques may be used for audio books, lectures, speeches, and other audio speech input.

Verbatim annotation may also be available to create verbatim text for training data 210 for the primary speaker. The operator may also use an ignore utterance function to exclude material before generate training session file.

Figure 4:
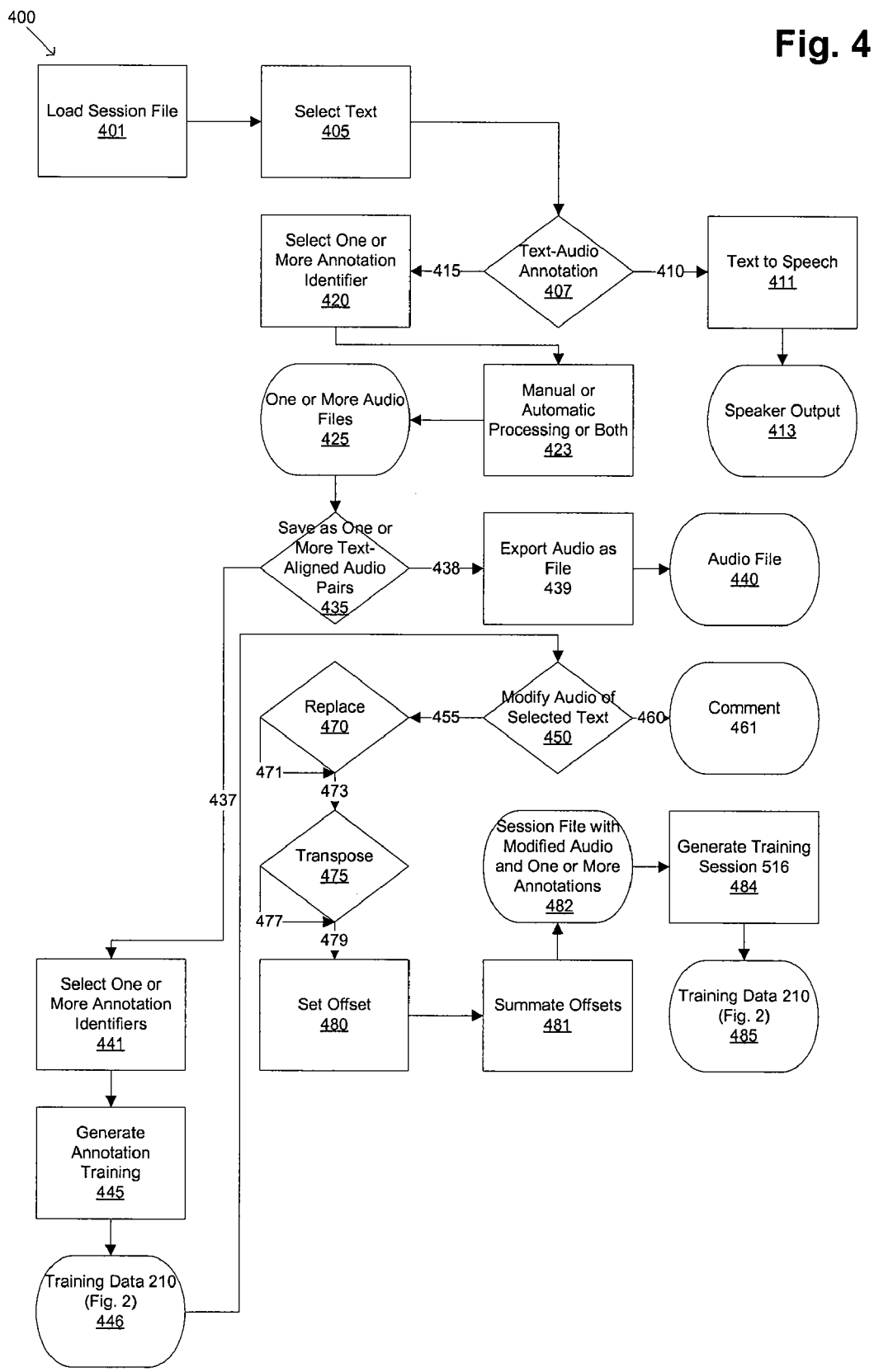
FIG. 4 is a flow diagram illustrating an overview of an exemplary embodiment of session file modification with text-to-speech.

In some instances, an operator may elect to correct or otherwise modify incorrectly transcribed audio-aligned text or other elements in the electronic file. Beginning with the load session file 301 step in FIG. 3, one or more operators may audio and text annotate using speech recognition and save the paired annotation audio-text for training data 210 for one or more second speakers. As described further in relation to FIG. 4, the audio may be modified with use of a text to speech plugin or manually recorded audio with audio annotation.

Once the audio text file has been completed, the session can be used in various ways. The loaded text may be displayed in a buffered session file window. A user can start playback beginning at any segment, including first one, and visualize the associated, highlighted text as the audio is played. This may be useful for audio books that may be created using techniques described herein. It may also be useful if audio input is music from song that has been segmented and associated to aligned text. By using control, operator can playback segments of recorded song and see corresponding lyrics highlighted. Using the tools for segmenting audio and redefining segment boundaries, user could create custom session file that has music aligned to text. This could be displayed on a big screen for group "singalongs" or by DJ for karaoke. With karaoke, the singer would see the lyrics and hear the music and sing into a microphone for playback through speakers. CDs are available for playback through special karaoke players (with display of text and playback of music), but segmentation cannot be customized. The application of the present disclosure allows segmentation to be customized. Moreover, with this application images may be associated with the text for customized segmentation, as well as the standard segmentation available from commercial manufacturers of karaoke CDs.

Audio Annotation with Text to Speech in Review 206

Review 206 may include operator selection of text-to-speech application, corresponding to one or more pattern recognition program 215, for modification of audio in one or more session files 205 created by manual or automatic means, or both. As with the speech recognition plugin/program, changes may be made in session file 205 displayed in read/write window of session file editor through audio and text annotations.

D. Modification of Speech Recognition Audio

In one approach, text to speech may be integrated into the session file editor as a plugin that loads with the parent software application. In a related approach, there may be one or more text-to-speech plugins, each representing a different text-to-speech engine, such as may be available from one or more manufacturers. The text-to-speech plugin may process selected text or a text file. The plugin may output speaker output or text-aligned audio.

After opening the text-to-speech plugin the process may select a user profile. The user profile may include representational model, data, or other rules for converting text to speech, including formatting text for processing and a voice font that determines the qualities of the synthetic speech.

After user profile selection, an operator may load session file 401 and select text 405. With audio-aligned text from manual or automatic processing or both 203/204 (FIG. 2), such as with manual transcription or speech recognition, the operator may select a word or phrase within a buffered read/write window of the session file editor that may be processed by the text-to-speech plugin/program. In one approach, if process determines 407 in step 410 not to create text-audio annotation in step 407, an operator may activate text-to-speech application 411, corresponding, in one approach to text-to-speech plugin/program. This will convert selected text into speaker output 413 ("speech function"). In a related approach (not shown in FIG. 4), the speaker output may be captured and saved as a file by exploiting the driver controls available with some sound cards to save audio output as a file.

Alternatively, in the exemplary approach, the process determines whether to create text-audio annotation 415. It may select audio-aligned text in the read/write window and create 415 audio and text annotation. The operator may select one or more annotation identifier 420 before manual or automatic text-to-speech processing or both 423. For automatic processing, the operator may enter text into the annotation tab by manual entry or selection of text file with operating system browse function. In one approach (not shown in FIG. 4), the operator may also activate the "speech function" of the text-to-speech plugin of session file editor to hear a sample of the speech produced by the application.

In the exemplary approach, the text-to-speech plugin produces one or more audio files 425 associated to the selected text in the read/write window. The process determines whether to save this data as one or more text-aligned audio pairs 435. If the process elects to do so in step 437, an operator may select one or more annotation identifiers 441, generate annotation training 445, and save the paired audio-text as a training data 210 for one or more pattern recognition programs 215. In this case, a pattern recognition program, such as speech recognition, would have a speech user profile based upon a synthetic voice determined by a voice font. In another approach, the process may determine 435 whether to save as one or more text-aligned audio pairs 435, but elect 438 to export audio as file 439 to create audio file 440. In another option (not shown in FIG. 4), the process could both export audio file and save audio file with paired text for training data 210.

In one approach, after generation of training data 210 in step 446, the process may determine whether to modify audio of selected (read/write window) text 450. If there is no modification, as indicated by option 460, the conversion with the text-to-speech plugin in the annotation window is a comment 461. It is in the form of audio and text annotation. In one approach, in the read/write window, the selected text may be color coded blue, since it includes both audio and text annotation. An operator may select text 405 in the read/write window, select the corresponding annotation in the annotation window, view the text annotation, and playback the synthetic audio annotation saved as a comment 461.

In another approach, the process determines whether to modify audio of selected (read/write window) text 450 and elects to do so, as indicated by option 455. The process may determine whether to replace 470 the audio tag of audio-aligned text in the read/write window of the session file editor or to transpose 475 it. The audio tag may be part of a session file 205 created from manual or automatic processing or both 203/204. In one approach, the automatic processing may represent a speech recognition pattern recognition program 215.

As indicated, the process may determine whether to replace 470 or transpose 475 the session file 205 audio tagged to the select text 405 with the annotation audio. The process may determine to replace 473, not to replace 471, transpose 479, or not to transpose 477. Preferably, there is a replace 473 or transpose 479. Without one or the other, in the exemplary approach, there is no modification of the audio tag of the select text 405 in the read/write window of the session file editor. The audio and text annotation effectively remains a comment 461.

If there is replacement 473 or transpose 479 with audio substitution into a session file 205 it is unlikely that the substituted audio will be the same length as the original audio, thus requiring modification of time stamps of the session file 205 to maintain alignment. If shorter, subsequent time stamps in the session file 205 may be reduced by a negative offset 480. If longer, subsequent time stamps may be increased by a positive offset 480. As some replaced 473 or transposed 479 audio may be shorter or longer, it may be necessary to summate 481 the positive and negative offsets to determine the start and duration times of utterances and individual words. Creating and summating time-stamp offsets are well known to those skilled in the art. The result may be a session file with modified audio tag and one or more annotations 482. After change of audio tag to create session file with modified audio 482, the process may generate training session (step 484) with the new audio tag to create training data (step 485).

In another approach, offset creation and summation may also be performed during postprocessing 207 (FIG. 2) and potentially during manual or automatic processing or both 203/204 (FIG. 2). In instances where the aligned data represents a volume, space, or other complex data form, and not two-dimensional data such as audio stream, more complex offsets may be needed.

In another approach, during review 206, the process may determine to audio annotate by recording of a human voice or selection of an audio file. In a further related approach, the process may determine to audio annotate a text file. As with text annotation, each word or phrase may have one or more audio annotations with one or more different identifiers, representing different synthetic voice fonts, speakers, or categories. These additional techniques may also generate annotation training (step 445) to save the paired audio-text of a secondary speaker as a training data 210 for one or more pattern recognition programs 215.

After replace 471 or transpose 477, the new audio tags 482 aligned to read/write window text of session file editor may be used to generate training session and training data 210 (step 485) for the primary speaker. As with text annotation, audio annotation may also be used to markup a session file consisting of segmented audio only, such as an untranscribed session file from boundary definition 202, or other bounded audio, images, or text.

As shown in FIGS. 5 through 9, each audio-aligned text segment may be indicated in the session file editor by a special marker (e.g. FIG. 5). The appearance of the special marker may depend on the style sheet selected in session file editor. Based upon the style sheet, the text segment markers correspond to divisions between utterances or other segments. In both the basic text/html and session file editing modes, the user may also open one or more buffered read/write windows within the main window.

By providing audio time stamps that point to the associated text, the time stamps may be used to find a corresponding location in the electronic text or resume listening to the audio after viewing the electronic text file. The operator may also mark as non-dictated text (e.g., table of contents, bibliographies, and so on) text that is not orally recorded by the professional reader. This will exclude the non-dictated text from association to audio. As illustrated in the figures, the interface may further include information about file and segment audio where the session file includes audio-aligned text. FIGS. 5, 6, and 7 also illustrate the audio tool bar, top left hand of interface, that displays the current position (elapsed) and duration of the loaded audio file for each buffered read/write window. A slider bar may also be associated with each window. The identification number of the segment, start, and duration times of the selected utterance may be displayed at the bottom of the buffered read/write window as a status bar. During auto playback, segments may be played continuously. With playback, the slider bar may appear to be moving directionally to the right, and display with the played duration time and segment identification number will change. Using the top slider bar, a user may "drag" playback point to another point within the same segment, or to a point in another segment. Using the window slider bar displayed in the annotation window, the user, in one approach, may only "drag" playback to another point within the segment.

The session editor may also facilitate audio playback of a segment or one or more selected words. The session editor may support USB playback devices (e.g. a transcriptionist foot pedal 110), a mouse 106, keyboard 108 and/or other user input mechanisms for navigation of audio and continuous playback, or playback of selected utterances.

The features of the session file editor may be used in different combination depending upon the task. The session file editor may be adapted for use as a front-end, graphical user interface for one or more real-time speech recognition applications 215.

Figure 17:
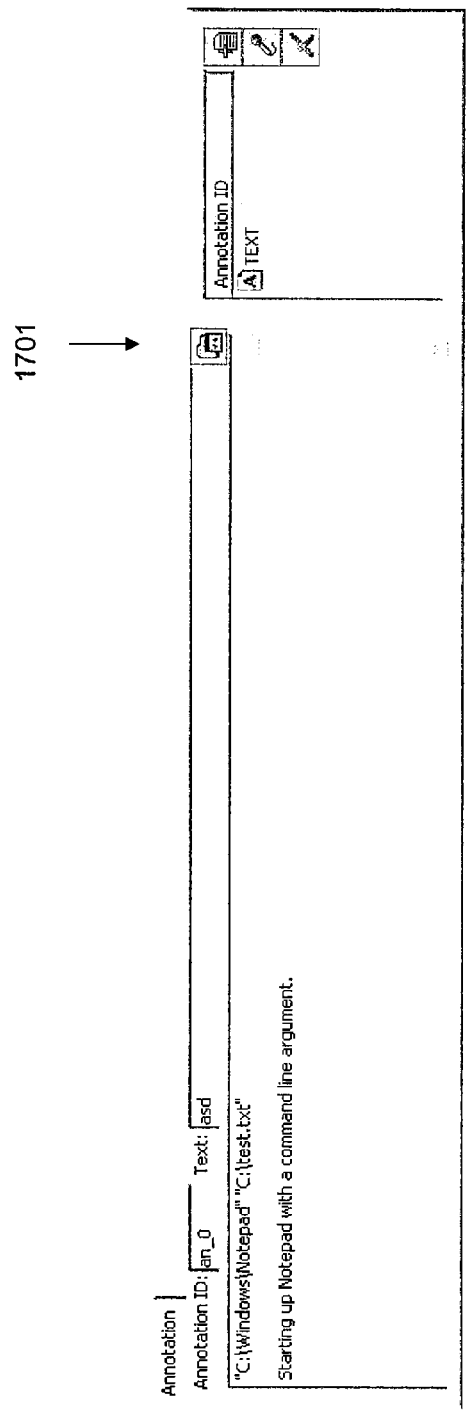
FIG. 17 illustrates the use of text annotation to create a dynamic universal resource locator (URL), dynamic file path and/or command line.

In session file editor 160, URLs may be displayed using text annotation. By clicking on a "run" button in annotation window, the process may run the URL displayed and opens browser, etc. The "run" button similarly may execute and run any file path string or command line. Because the annotation window has multiple levels, based upon one or more different annotation identifiers, annotated text consequently can have one or more URLs associated to it. In this manner, the URLs can be made dynamic. For instance, a pull-down type menu could appear upon clicking the URL showing all of the annotation identifiers associated with the "hyperlink" so that the end-user can select which link to "run." With execution of a command line, a program may open a file and playback audio or video beginning at a certain point corresponding to text or a graphic in the session file. One example is displayed in FIG. 17 where, as the comment indicates, the command line may be used to launch Notepad. In one approach, the "run" button 1701 may be displayed in the top right-hand corner next to the text bar.

The foregoing description and drawings merely explain and illustrate the invention and the invention is not limited thereto. While the specification in this invention is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed:

1. An apparatus comprising:
a session file including one or more audio files and text associated with each audio file segment;
a session file editor for displaying text and providing text selection capability and playing back audio;
an annotation window operably associated with the session file editor supporting user modification of the selected text, the annotation window saving modified text corresponding to the selected text from the session file editor and audio associated with the modified text;
means for concatenating the modified text and audio associated therewith for two or more instances of the selected text; and
means for training a speech user profile using a concatenated file formed by the concatenating means.

2. The apparatus according to claim 1 wherein the session file has original audio associated with the selected text, wherein the apparatus further comprising:
means for substituting the modified text for the selected text;
means for concatenating the modified text and audio associated therewith for two or more instances of the selected text; and
means for training a speech user profile using a concatenated file formed by the concatenating means.

3. The apparatus according to claim 2 wherein the annotation window further supports selective display of the modified text in place of the selected text.

4. The apparatus according to claim 2 wherein the annotation window further supports selective modification of the selected text.

5. The apparatus according to claim 2 wherein the annotation window further comprises means for indicating that the modified text should not be substituted for the selected text.

6. The apparatus according to claim 2 wherein the session file indicates that an element has no associated audio.

7. The apparatus according to claim 2 wherein means for substituting modified text for selected text created by a first user with a pattern recognition program includes modification by one or more second users with a pattern recognition program.

* * * * *